(12) United States Patent
Kotaki

(10) Patent No.: US 8,824,089 B1
(45) Date of Patent: Sep. 2, 2014

(54) TAPE CARTRIDGE AND TAPE DEVICE

(71) Applicant: Fujitsu Limited, Kawasaki (JP)

(72) Inventor: Yoshio Kotaki, Nagano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/173,896

(22) Filed: Feb. 6, 2014

(30) Foreign Application Priority Data

Mar. 21, 2013 (JP) ................................. 2013-058013

(51) Int. Cl.
*G11B 15/18* (2006.01)

(52) U.S. Cl.
USPC ............................ 360/71; 360/92.1; 360/96.3

(58) Field of Classification Search
None
See application file for complete search history.

(56) References Cited

U.S. PATENT DOCUMENTS

| 5,511,183 A | 4/1996 | Ohmido |
| 5,767,647 A | 6/1998 | Akiyama et al. |
| 5,982,120 A | 11/1999 | Akiyama et al. |
| 6,215,618 B1 * | 4/2001 | Anderson et al. ............. 360/128 |

FOREIGN PATENT DOCUMENTS

| JP | 06-251475 | 9/1994 |
| JP | 2010-27189 | 2/2010 |

* cited by examiner

*Primary Examiner* — Paul Huber
(74) *Attorney, Agent, or Firm* — Fujitsu Patent Center

(57) ABSTRACT

A tape cartridge includes a drive gear that is rotatably driven by a driving device, a first reel that winds a first tape-like storage medium therearound and is rotatable by a driving force transmitted from the drive gear, a second reel that winds a second tape-like storage medium therearound and is rotatable by a driving force transmitted from the drive gear, and a blocking unit that blocks transmission of the driving force from the drive gear to the first or second reel.

11 Claims, 32 Drawing Sheets

TAPE CARTRIDGE AND TAPE DEVICE

CROSS-REFERENCE TO RELATED APPLICATIONS

This application is based upon and claims the benefit of priority of the prior Japanese Patent Application No. 2013-058013, filed on Mar. 21, 2013, the entire contents of which are incorporated herein by reference.

FIELD

The embodiments discussed herein are related to a tape cartridge and a tape device.

BACKGROUND

In Linear Tape-Open (LTO) media, there are standards of different generations such as LTO-3, LTO-4, and LTO-5. In these LTO media, as the number increases to LTO-3, LTO-4, and LTO-5, a recording capacity or a recording/playback speed increases.

Furthermore, even in drives that perform writing and reading of data with respect to these LTO media, there are drives of multiple generations depending on the type of the LTO media. For example, as these drives, there are an LTO-G3 drive, an LTO-G4 drive, and an LTO-G5 drive.

In tape library devices (tape devices) including the above-described drive and capable of performing recording/playback of these LTO media, there is a device equipped with a plurality of drives of different generations.

The LTO-G3 drive can record/play back only the LTO-3 medium. In addition, the LTO-G4 drive can record/play back the LTO-3 medium and the LTO-4 medium, but does not record/play back the LTO-G5 medium. Moreover, the LTO-G5 drive can record/play back the LTO-4 medium and the LTO-5 medium, and can play back the LTO-3 medium, but does not record the LTO-3 medium.

When installing the tape device or when installing additional drives, in a case in which a failure occurs in the drive, it is preferably to perform the connection confirmation (diagnosis) between the tape device and a host device. The diagnosis is performed by loading conventional LTO media that are commercially available to the drive as a diagnostic medium LTO.

When diagnosing the tape device equipped with the drive of third-generation as described above, it is confirmed whether or not each drive is normally working using two volumes of the diagnostic LTO-3 medium and the LTO-5 medium.

[Patent Literature 1] Japanese Laid-open Patent Publication No. 6-251475

[Patent Literature 2] Japanese Laid-open Patent Publication No. 2010-27189

However, as described above, in the conventional tape device that includes the LTO-G3 drive, the LTO-G4 drive, and the LTO-G5 drive in a mixed manner, there is a problem in that two volumes of the LTO-3 medium and the LTO-5 medium are used for diagnosis, the diagnostic LTO media of multiple generations are included for diagnosis, and thus the cost increases. In particular, the conventional LTO media that are commercially available have a length of tape of 800 m and are expensive. Furthermore, there is also a problem in that the tape device includes a dedicated cell for storing the LTO-3 medium and the LTO-5 medium for diagnosis, and the tape device increases in size.

SUMMARY

According to an aspect of the embodiments, the tape cartridge includes a drive gear that is rotatably driven by a driving device, a first reel that winds a first tape-like storage medium therearound and is rotatable by a driving force transmitted from the drive gear, a second reel that winds a second tape-like storage medium therearound and is rotatable by the driving force transmitted from the drive gear, and a blocking portion that blocks the transmission of the driving force from the drive gear to the first or second reel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
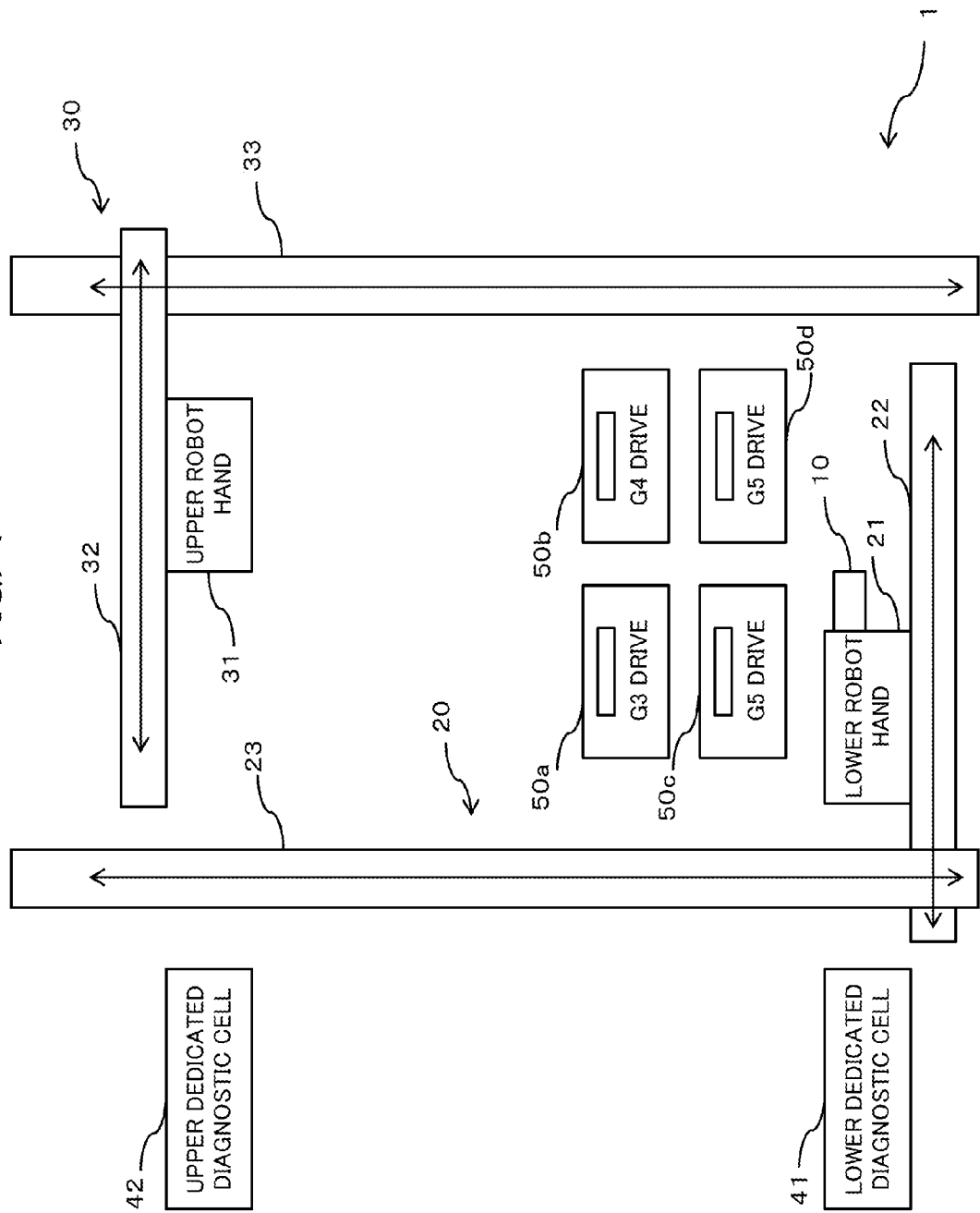
FIG. 1 is a diagram schematically illustrating a hardware configuration of a tape device as an example of an exemplary embodiment.

Hereinafter, exemplary embodiments according to a tape cartridge and a tape device will be described with reference to the drawings. However, the exemplary embodiments described below are just examples, and are not intended to exclude the application of various modified examples and technologies that are not specified in the exemplary embodiments. That is, the exemplary embodiment can be carried out as various modifications (such as combining the exemplary embodiments with respective modified examples) without departing from the spirit thereof.

Furthermore, each drawing can include other functions or the like, instead of the effect that includes only components illustrated in the drawings.

[A] AN EXEMPLARY EMBODIMENT

[A-1] Configuration of Tape Device

Figure 2:
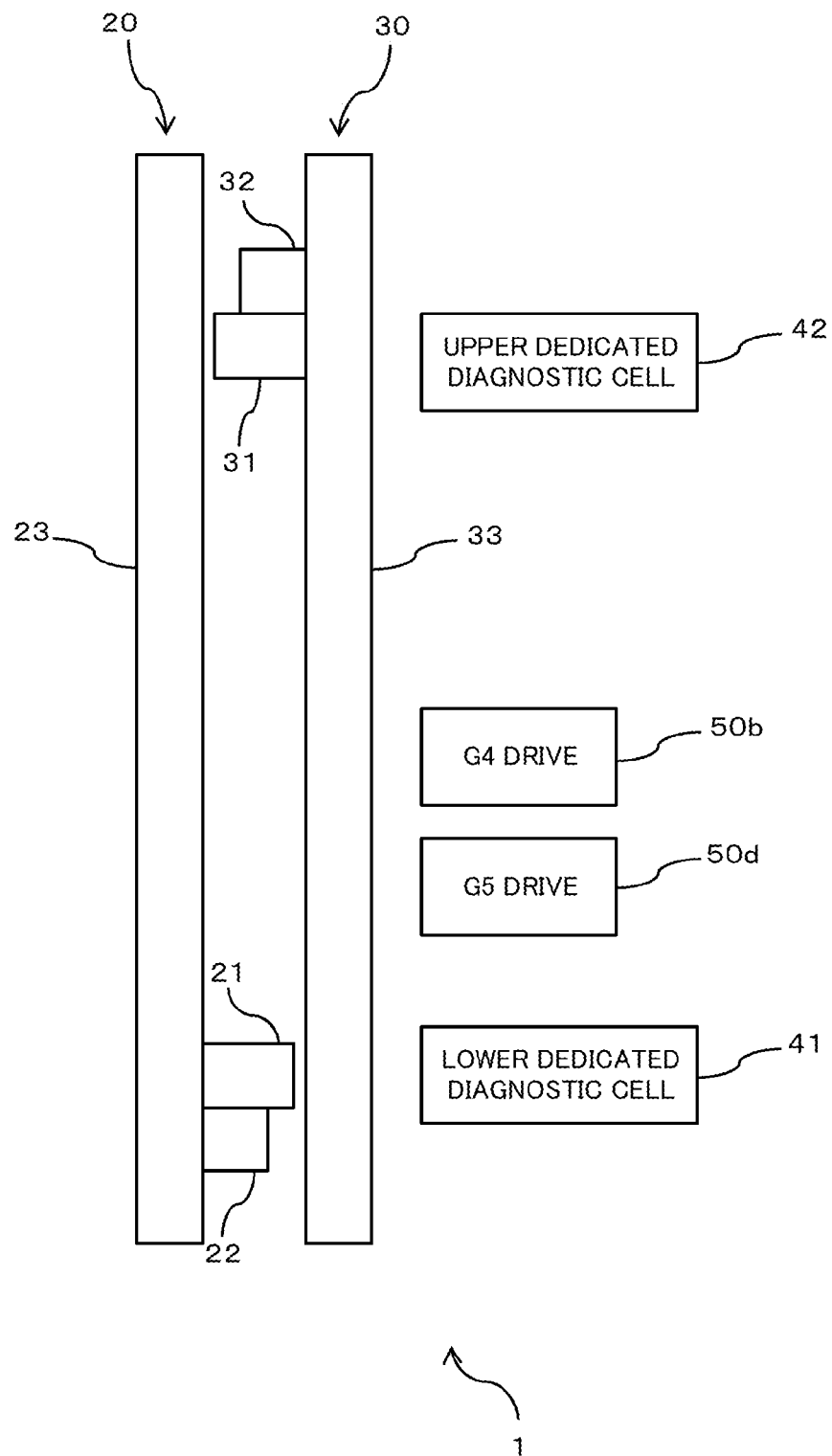
FIG. 2 is a side view of FIG. 1.
Figure 3:
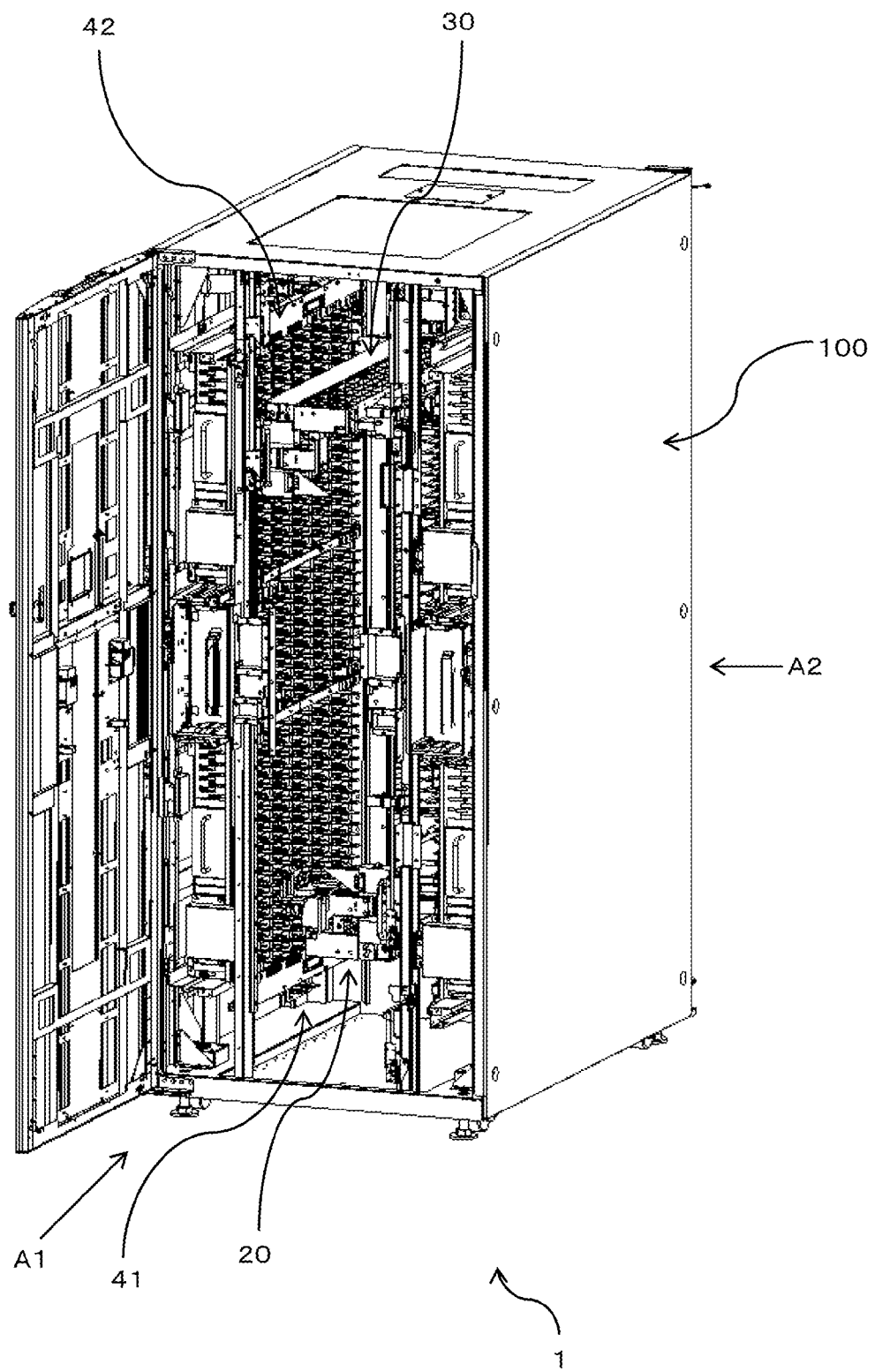
FIG. 3 is a perspective view illustrating an exterior of the tape device as an example of the exemplary embodiment.

FIG. 1 is a diagram schematically illustrating a hardware configuration of a tape library device (a tape device) as an example of an exemplary embodiment, FIG. 2 is a side view of FIG. 1, and FIG. 3 is a perspective view illustrating an exterior of a tape device as an example of the exemplary embodiment.

In addition, FIG. 1 corresponds to a diagram seen from a direction A1 of FIG. 3, and FIG. 2 is a diagram seen from a direction A2 of FIG. 3. Furthermore, in FIGS. 1 and 2, only some parts of the components are extracted and illustrated.

As illustrated in FIGS. 1 and 2, a tape device 1 as an example of the present exemplary embodiment includes a lower robot mechanism 20, an upper robot mechanism 30, a lower dedicated diagnostic cell (a medium storing portion) 41, an upper dedicated diagnostic cell (a medium storing portion) 42, and drives (a media reading/writing device) 50a to 50d. In addition, reference numeral 100 illustrated in FIG. 3 illustrates a housing of the tape device 1.

Hereinafter, as reference numerals indicating the drives, when specifying to one of a plurality of drives, reference numerals 50a to 50d are used, but when referring to any drive, reference numeral 50 is used.

The tape device 1 includes one or more cells that store a conventional LTO medium, and the lower robot mechanism 20 (or the upper robot mechanism 30) conveys the LTO medium stored in the cell to each drive 50. Moreover, the drive 50 performs recording/playback of the LTO medium.

The tape device 1 as an example of the exemplary embodiment has a function of performing the operation confirmation (diagnosis) of each drive 50 by the diagnostic LTO media (tape cartridges) 10 (as will be described below with reference to FIGS. 4 to 18). The diagnostic LTO media 10 are stored in the lower dedicated diagnostic cell 41 and the upper dedicated diagnostic cell 42, respectively, and are conveyed to the drive 50 by the lower robot mechanism 20 (or the upper robot mechanism 30). In addition, a lower robot hand 21 is able to take out the diagnostic LTO medium 10 stored in the lower dedicated diagnostic cell 41, and an upper robot hand 31 is able to take out the diagnostic LTO medium 10 stored in the upper dedicated diagnostic cell 42.

The lower dedicated diagnostic cell 41 and the upper dedicated diagnostic cell 42 are cells that store the diagnostic LTO media 10. In an example of the exemplary embodiment, the mainly used diagnostic LTO medium 10 is stored in the lower dedicated diagnostic cell 41, and the spare diagnostic LTO medium 10 is stored in the upper dedicated diagnostic cell 42. The mainly used diagnostic LTO medium 10 and the spare diagnostic LTO medium 10 provide a functional configuration similar to each other. For example, in a case in which some fault occurs in the currently used diagnostic LTO medium 10 stored in the lower dedicated diagnostic cell 41 or the lower robot mechanism 20, the diagnosis is performed using the spare diagnostic LTO medium 10 stored in the upper dedicated diagnostic cell 42.

Figure 22:
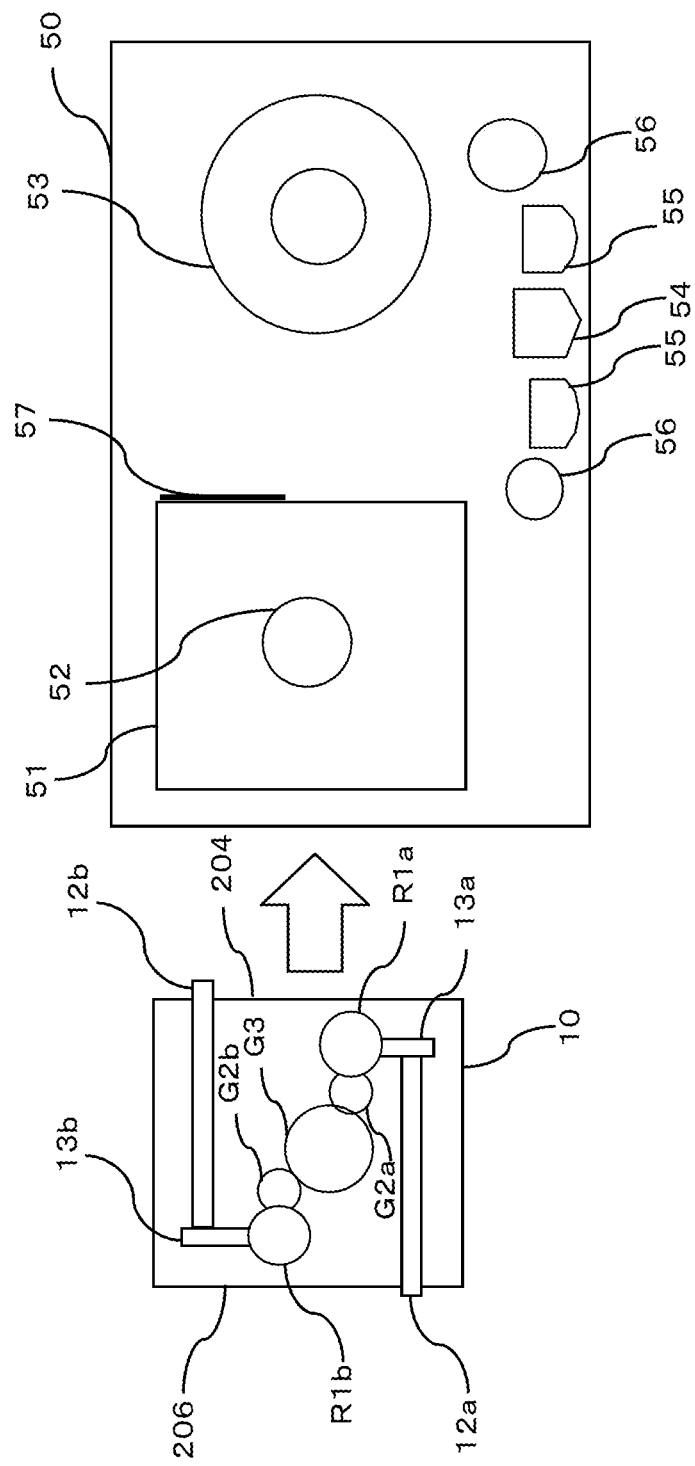
FIG. 22 is a diagram illustrating a diagnostic process in the tape device as an example of the exemplary embodiment.

The drive 50 is a device that records/plays back the LTO medium. Specifically, as illustrated in FIG. 22 and the like, the drive 50 includes a loader mechanism unit 51, a motor clutch (a driving device) 52, a machine reel 53, a head 54, a guide 55, a roller guide 56, and a wall 57.

When being inserted into the drive 50, the diagnostic LTO medium 10 is loaded to the loader mechanism unit 51, one side surface of the diagnostic LTO medium 10 (side surface 204 or 206 as will be described later) hits the wall 57 and is positioned. The motor clutch 52 transmits a driving force to a drive gear GR described later included in the diagnostic LTO media 10. An LTO-3 tape 15a or an LTO-5 tape 15b described below is sent out of the diagnostic LTO medium 10, passes through the head 54 while being guided by a guide 55 and a roller guide 56, and is wound around the machine reel 53. The LTO-3 tape 15a or the LTO-5 tape 15b is recorded/played back by the head 54.

Furthermore, the conventional general LTO medium is also recorded/played back by the drive 50 in the same manner as the diagnostic LTO medium 10.

In the example illustrated in FIG. 1, the tape device 1 is provided with an LTO-G3 drive 50a, an LTO-G4 drive 50b, and two LTO-G5 drives 50c and 50d as the drive 50.

The lower robot mechanism 20 includes a lower robot hand (a first conveying unit) 21, a horizontal rail 22, and a vertical rail 23.

The vertical rail 23 is a rail for guiding the horizontal rail 22 in an up-and-down direction of FIG. 1, and is disposed in the housing 100 in the vertical direction.

The horizontal rail 22 is a rail for guiding the lower robot hand 21 in a right-and-left direction of FIG. 1, and, for example, is horizontally mounted along an arrangement direction of a plurality of drives 50c and 50d. The horizontal rail 22 is movable in the up-and-down direction along the vertical rail 23 by a driving device (not illustrated).

The lower robot hand 21 is installed so as to be movable on the horizontal rail 22 by a driving device (not illustrated). Furthermore, the lower robot hand 21 includes a gripping unit 24 illustrated in FIG. 20 and the like, and grips the diagnostic LTO medium 10 by the gripping unit 24.

In addition, the configuration of the lower robot hand 21 can be variously modified.

In this way, the lower robot hand 21 moves in the up-and-down direction and the right-and-left direction (the vertical direction and the horizontal direction inside of the housing 100) of FIG. 1, by moving in a housing 100 by the horizontal rail 22 and the vertical rail 23. Thus, the diagnostic LTO media 10 are conveyed between the lower dedicated diagnostic cell 41 and each of the drives 50.

The upper robot mechanism 30 includes the upper robot hand (a second conveying unit) 31, a horizontal rail 32, and a vertical rail 33.

The vertical rail 33 is a rail for guiding the horizontal rail 32 in the up-and-down direction of FIG. 1, and is disposed in the housing 100 in the vertical direction.

The horizontal rail 32 is a rail for guiding the upper robot hand 31 in the right-and-left direction of FIG. 1, and, for example, is horizontally mounted along the arrangement direction of the plurality of drives 50c and 50d. The horizontal rail 32 is movable in the up-and-down direction along the vertical rail 33 by a driving device (not illustrated).

The upper robot hand 31 is arranged so as to be movable on the horizontal rail 32 by a driving device (not illustrated). Furthermore, the upper robot hand 31 includes a gripping unit 34 illustrated in FIG. 27 and the like, and grips the diagnostic LTO medium 10 by the gripping unit 34.

In addition, the configuration of the upper robot hand 31 can be variously modified.

In this way, the upper robot hand 31 moves in the up-and-down direction and the right-and-left direction (the vertical direction and the horizontal direction in the housing 100) of FIG. 1, by moving within the housing 100 by the horizontal rail 32 and the vertical rail 33. Thus, the diagnostic LTO medium 10 is conveyed between the upper dedicated diagnostic cell 42 and the respective drives 50.

In an example of the exemplary embodiment, as will be described later with reference to FIG. 27, the lower robot hand 21 is able to deliver the diagnostic LTO medium 10 that is conveyed to the upper robot hand 31. Furthermore, the upper robot hand 31 is also able to deliver the diagnostic LTO medium 10 that is conveyed to the lower robot hand 21. That is, in the housing 100, the lower robot hand 21 and the upper robot hand 31 are configured to be allowed to approach the position where the robot hands deliver the diagnostic LTO medium 10.

In addition, a control device (not illustrated) performs the control of the lower robot mechanism 20 and the upper robot mechanism 30.

For example, the lower robot mechanism 20, the upper robot mechanism 30, the lower dedicated diagnostic cell 41, and the upper dedicated diagnostic cell 42 can be implemented as illustrated in FIG. 3.

[A-2] Configuration of Diagnostic LTO Medium

Figure 4:
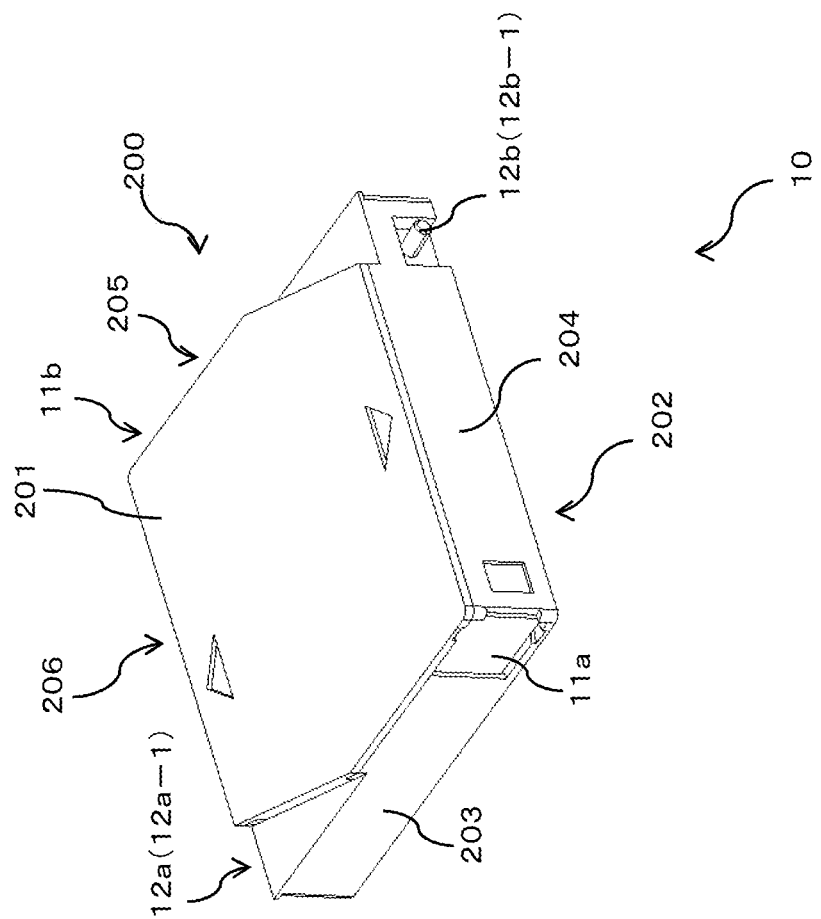
FIG. 4 is a perspective view illustrating an exterior of a diagnostic LTO medium as an example of the exemplary embodiment.
Figure 5:
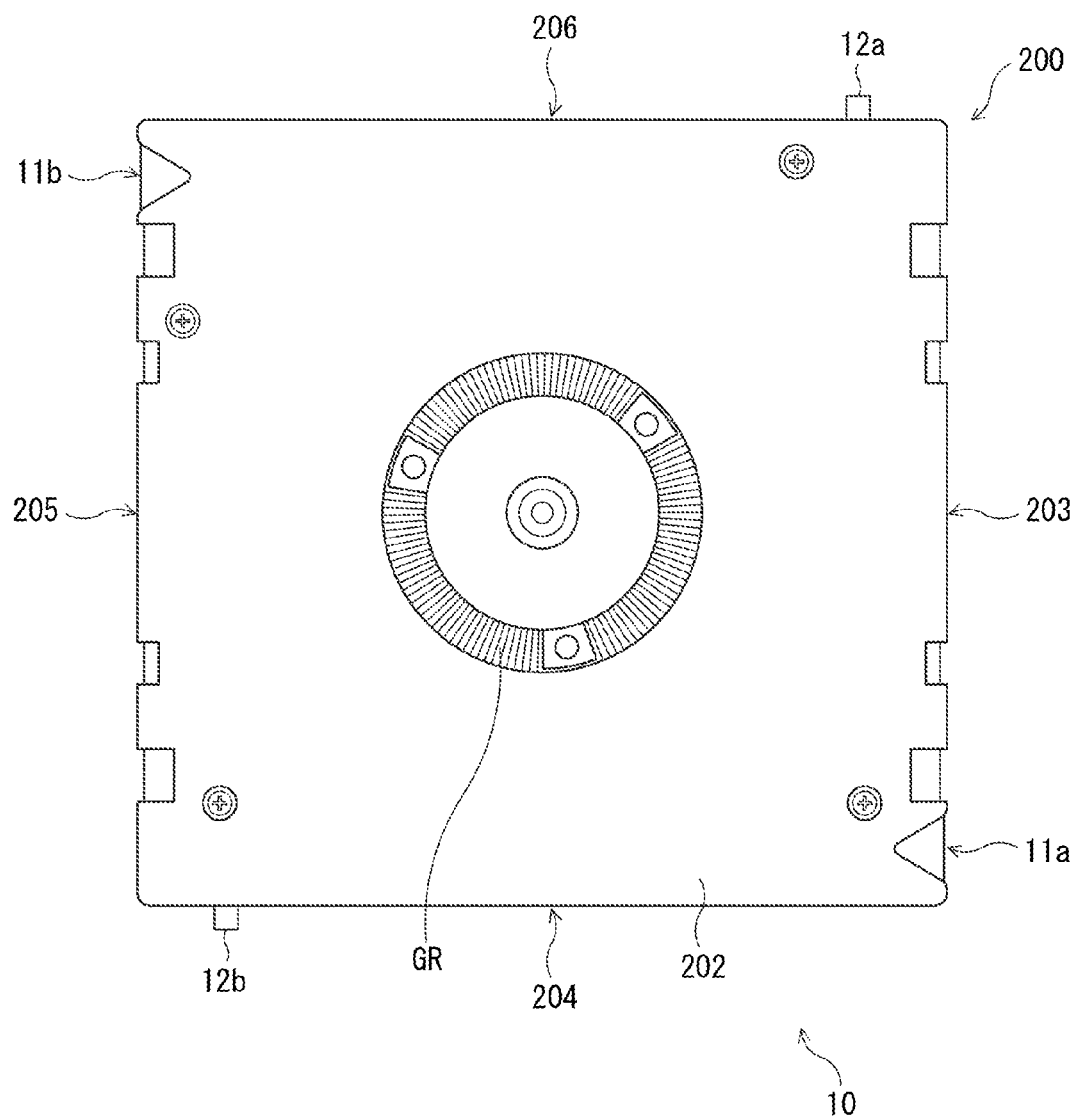
FIG. 5 is a bottom view of the diagnostic LTO media as an example of the exemplary embodiment.

FIG. 4 is a perspective view illustrating the exterior of a diagnostic LTO medium as an example of the exemplary embodiment, and FIG. 5 is a bottom view of the diagnostic LTO medium as an example of the exemplary embodiment.

A casing 200 of the diagnostic LTO medium 10 is disposed so that a substantially square-shaped top surface 201 and a bottom 202 are parallel to each other. Furthermore, the respective sides of the top surface 201 and the bottom surface 202 are surrounded by side surfaces 203 to 206, respectively. The side surface 203 and the side surface 205 are disposed in parallel to each other, and the side surface 204 and the side surface 206 are disposed in parallel to each other. Furthermore, the outer dimension of the casing 200 is dimensioned according to the standard of the LTO.

Furthermore, the diagnostic LTO medium 10 has a configuration capable of being recorded/played back by the conventional drive 50.

As illustrated in FIG. 4, an opening portion (a first opening portion) 11a is provided on the side surface 203 of the diagnostic LTO medium 10, a push pin (a pressing unit) 12b is provided on the side surface 204, an opening portion (a second opening portion) 11b is provided on the side surface 205, and a push pin (a pressing unit) 12a is provided on the side surface 206. Specifically, the opening portion 11a and the opening portion 11b are provided on the side surfaces 203 and 205 facing each other, respectively, and the push pin 12a and the push pin 12b are provided on the side surfaces 206 and 204 facing each other, respectively. In other words, the opening portion 11a and the opening portion 11b are provided at positions point-symmetrical to each other around a center of gravity of the top surface 201, and the push pin 12a and the push pin 12b are also provided at positions point-symmetrical to each other around a center of gravity of the top surface 201.

In addition, the function of the opening portions 11a and 11b, and the push pins 12a and 12b will be described later with reference to FIGS. 8 to 18.

Figure 8:
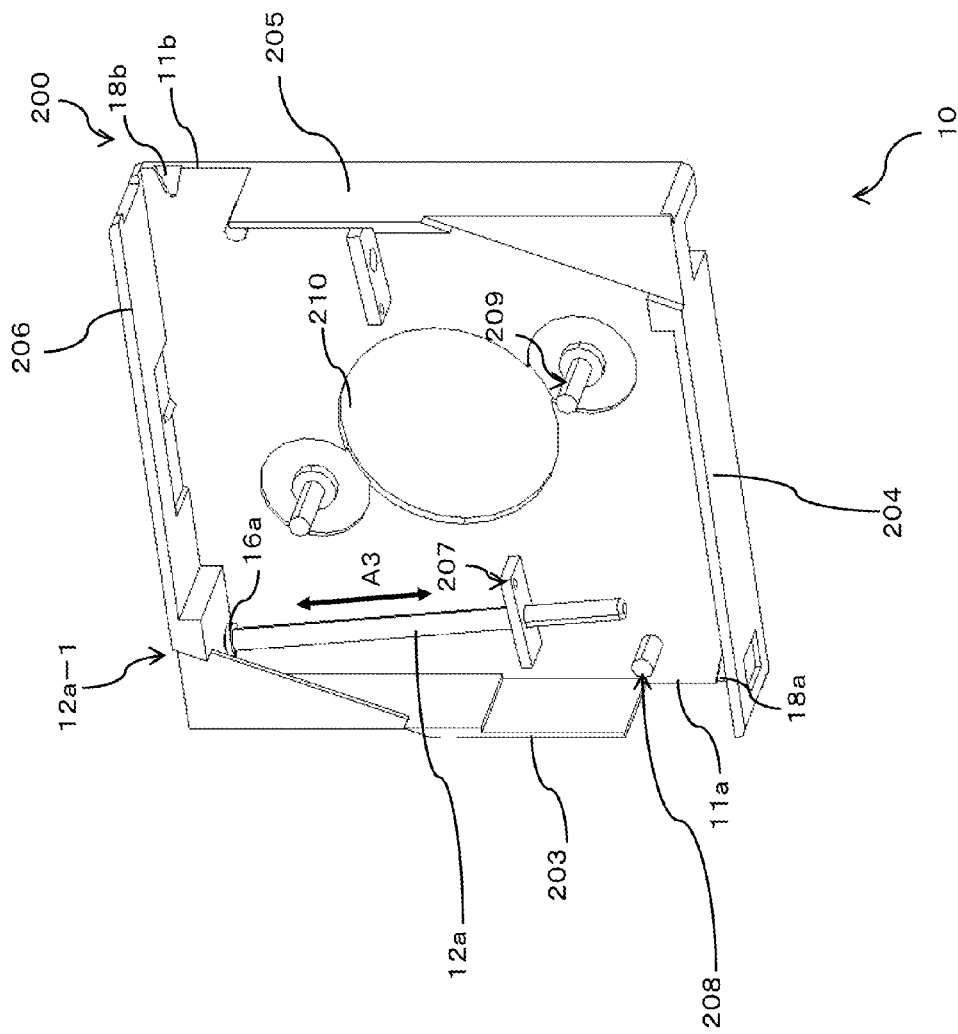
FIG. 8 is a diagram illustrating a functional configuration of the diagnostic LTO medium as an example of the exemplary embodiment.

For example, as illustrated in FIG. 8, a circular opening portion 210 is formed on the bottom surface 202 of the diagnostic LTO medium 10, and as illustrated in FIG. 5, the drive gear GR is arranged concentrically with the opening portion 210.

The drive gear GR is radially formed with teeth on the surface of the side that is exposed from the opening portion 210, and when the diagnostic LTO medium 10 is loaded to the drive 50, the drive gear GR is engaged with a motor clutch 52 of the drive 50 to transmit the driving force from the motor clutch 52. In addition, the details of the drive gear GR will be described later with reference to FIGS. 16 to 18.

Figure 6:
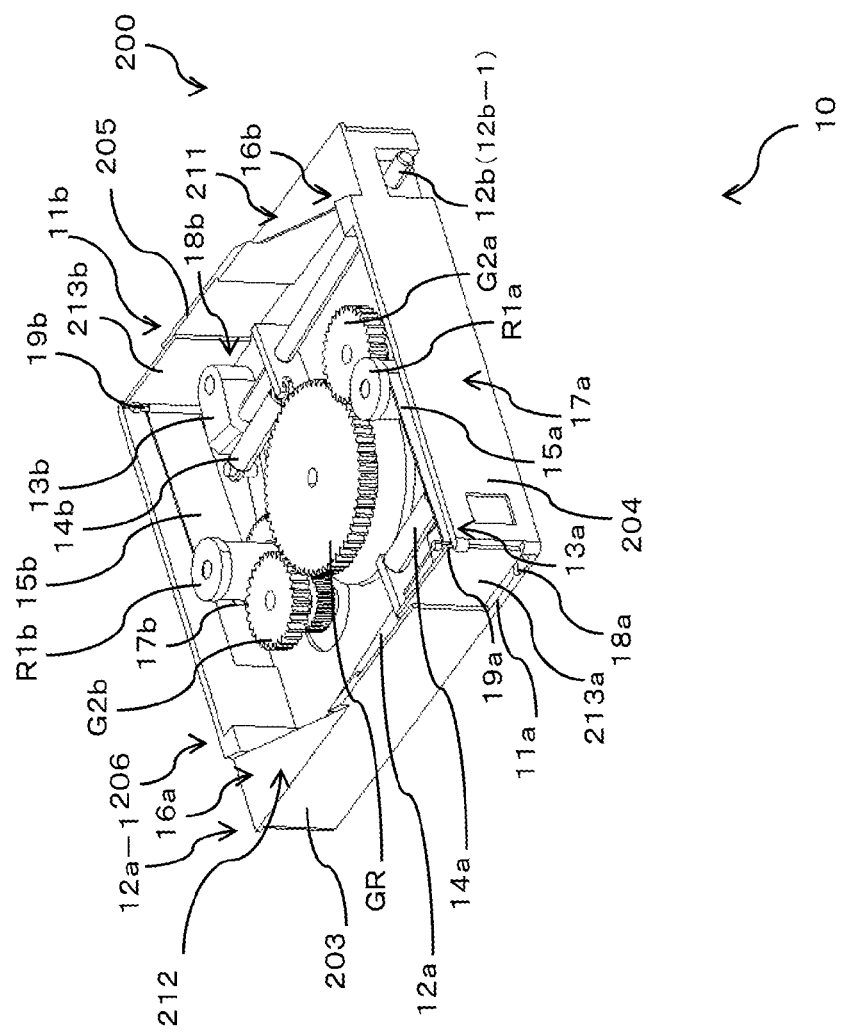
FIG. 6 is a perspective view illustrating an internal configuration of the diagnostic LTO medium as an example of the exemplary embodiment.
Figure 7:
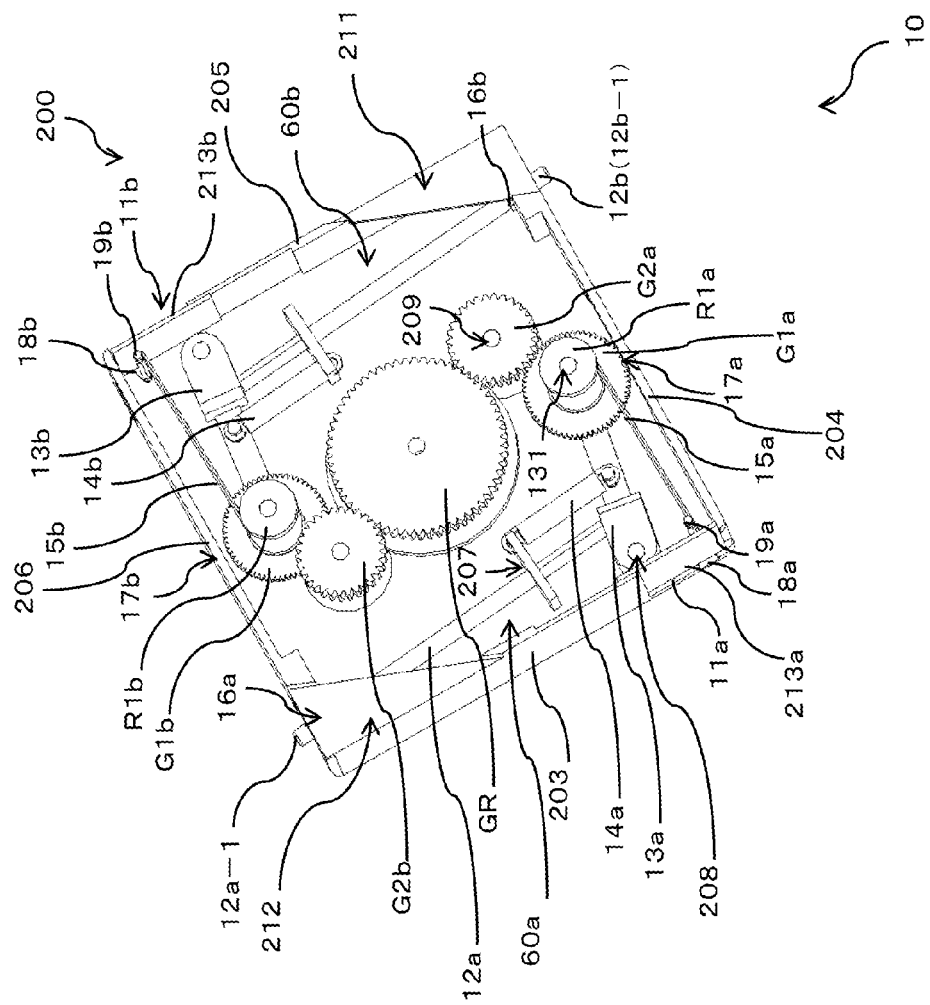
FIG. 7 is a perspective view illustrating the internal configuration of the diagnostic LTO medium as an example of the exemplary embodiment.

FIGS. 6 and 7 are perspective views illustrating the internal structure of the diagnostic LTO medium as an example of the exemplary embodiment.

In FIGS. 6 and 7, a part of the top surface 201 of the diagnostic LTO medium 10 is not illustrated for description.

As illustrated in FIGS. 6 and 7, the diagnostic LTO medium 10 includes opening portions 11a and 11b, push pins 12a and 12b, arm members 13a and 13b, biasing members 14a and 14b, an LTO-3 tape (a first tape-like storage medium) 15a, an LTO-5 tape (a second tape-like storage medium) 15b, E rings 16a and 16b, rotation suppressing units 17a and 17b, recess portions 18a and 18b, leader pins 19a and 19b, shutters 213a and 213b, reels R1a and R1b, mediation gears G2a and G2b, a drive gear GR, and storage units (a first storage unit and a second storage unit) 211 and 212.

Here, the reel R1a and the mediation gear G2a are arranged so as to be adjacent to each other.

Furthermore, the teeth are also formed on the outer periphery of the gear GR, and the mediation gear G2a and the drive gear GR are disposed so as to be meshed with each other. Furthermore, the reel R2a and the mediation gear G2b are arranged so as to be adjacent to each other, and the mediation gear G2b and the drive gear GR are disposed so as to be meshed with each other.

The push pin 12a and the push pin 12b are arranged so as to be point-symmetrical to each other around the axis of rotation of the drive gear GR. Furthermore, the arm member 13a and the arm member 13b are also arranged so as to be point-symmetrical to each other around the axis of rotation of the drive gear GR. In addition, the reel R1a and the reel R2a are also arranged so as to be point-symmetrical to each other around the axis of rotation of the drive gear GR. Furthermore, the mediation gear G2a and the mediation gear G2b are arranged so as to be point-symmetrical to each other around the axis of rotation of the drive gear GR.

FIGS. 8 to 18 are diagrams illustrating the functional configuration of the diagnostic LTO medium as an example of the exemplary embodiment.

Hereinafter, the detailed functional configuration of each part included in the above-described diagnostic LTO medium 10 will be described with reference to FIGS. 8 to 18. In addition, in FIGS. 8 to 18, some of the elements included in the diagnostic LTO medium 10 are not illustrated for description.

Figure 9:
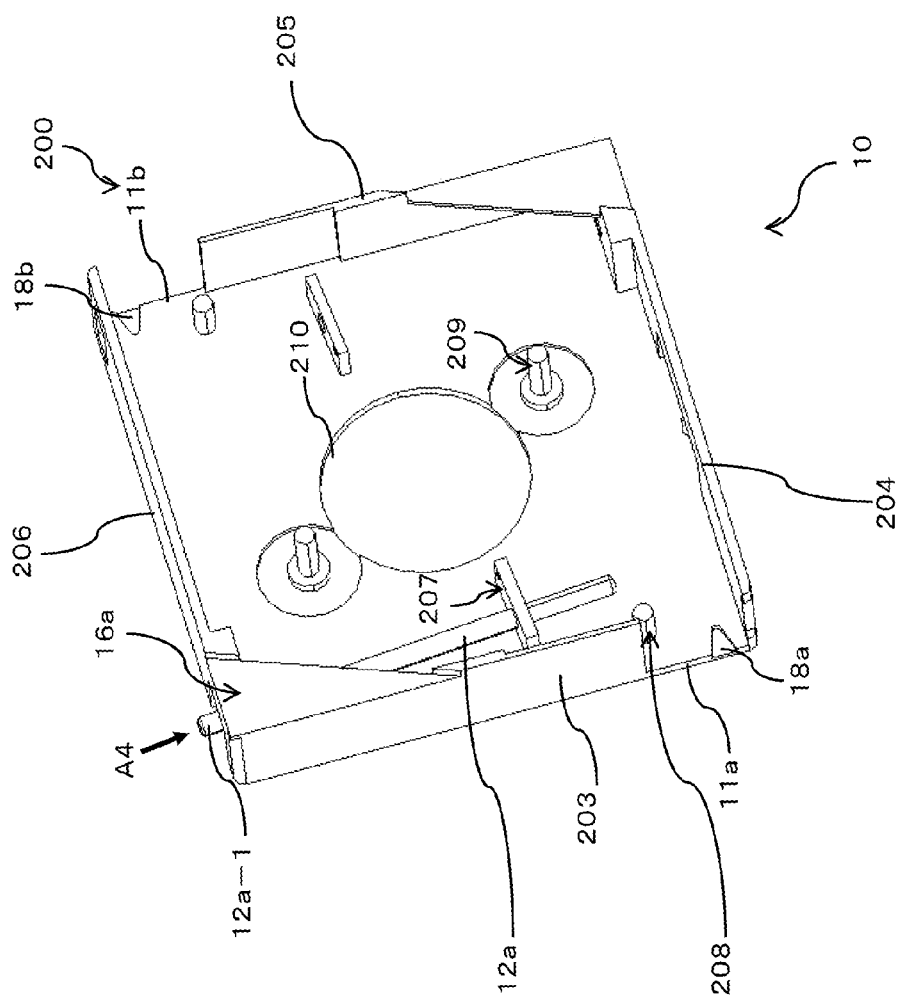
FIG. 9 is a diagram illustrating a functional configuration of the diagnostic LTO medium as an example of the exemplary embodiment.

FIGS. 8 and 9 do not illustrate each part other than the opening portions 11a and 11b, the push pin 12a, the recess portions 18a and 18b, the E ring 16a, and the casing 200 in the diagnostic LTO medium 10. Specifically, FIG. 8 illustrates a state in which the push pin 12a slides, and FIG. 9 illustrates a state in which the push pin 12a is pushed into the casing 200 from the outside.

As illustrated in FIG. 9, the push pin 12a is installed so that one end thereof (an end portion 12a-1) protrudes to the outside of the diagnostic LTO medium 10 through a hole formed on the side surface 206. Furthermore, as illustrated by a double arrow A3 of FIG. 8, the push pin 12a is disposed so as to be slidable in the axial direction through a guide 207 protruding from the inner surface of the casing 200 of the bottom surface 202. Thus, as illustrated by an arrow A4 of FIG. 9, the push pin 12a is pushed into the casing 200 by being pressed from the outside of the diagnostic LTO medium 10. However, the E ring 16a is provided on the inner side of the position where the push pin 12a passes through the side surface of the diagnostic LTO medium 10, and thus the push pin 12a does not fall out of the side surface 206 of the diagnostic LTO medium 10.

Figure 10:
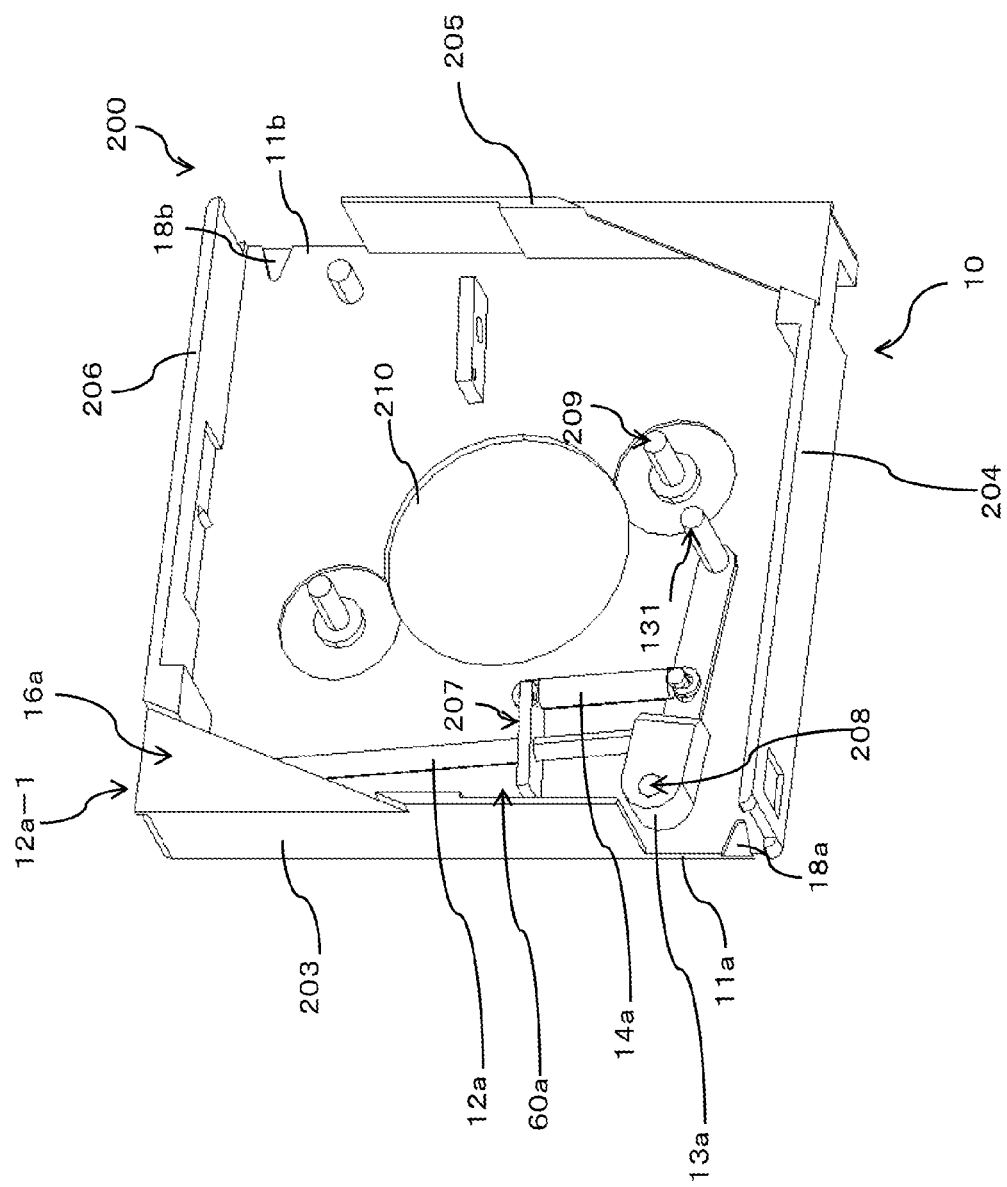
FIG. 10 is a diagram illustrating a functional configuration of the diagnostic LTO medium as an example of the exemplary embodiment.
Figure 11:
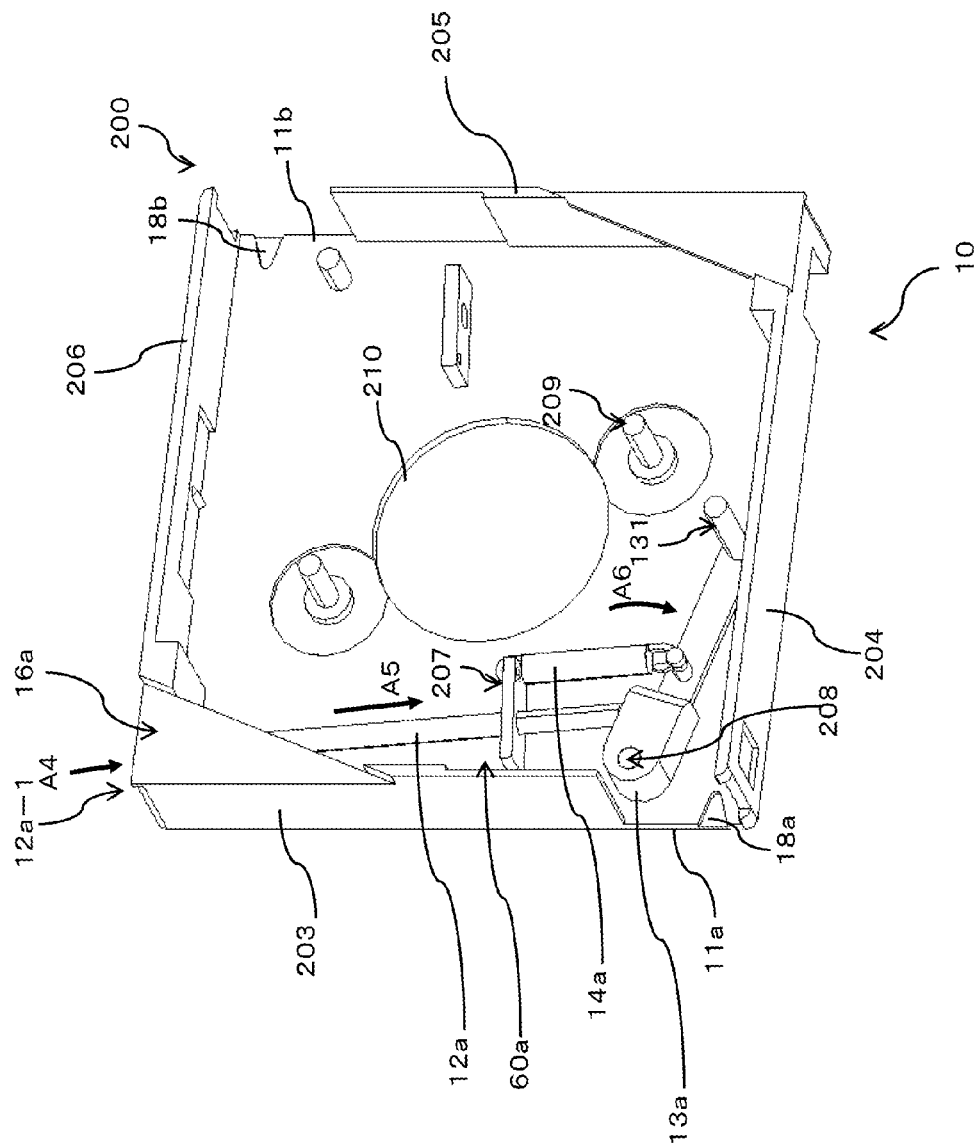
FIG. 11 is a diagram illustrating a functional configuration of the diagnostic LTO medium as an example of the exemplary embodiment.

FIGS. 10 and 11 illustrate an arm member 13a and a biasing member 14a in addition to FIGS. 8 and 9 as described above. Specifically, FIG. 10 illustrates a state in which the arm member 13a is located at an initial position, and FIG. 11 illustrates a state in which the arm member 13a is spaced apart from the initial position.

The arm member 13a is disposed to be substantially parallel to the side surface 204, and is pivotally supported by a shaft 208 projecting from the inner surface of the casing 200 of the bottom surface 202 at one end thereof. Furthermore, in an end portion of a side opposite to the side which is axially supported by the shaft 208 in the arm member 13a, a shaft 131 is projected to be parallel to the shaft 208.

The biasing member 14a is an elastic member such as a spring and a rubber, is hooked to the guide 207 at one end thereof, is hooked to the arm member 13a at the other end thereof, and biases the arm member 13a in a direction of attracting the arm member 13a to the side surface 206 side.

As illustrated by an arrow A4 in FIG. 11, when an end portion 12a-1 of the push pin 12a is pressed toward the interior of the casing 200 from the outside, the push pin 12a is moved in a direction of an arrow A5. Accordingly, the arm member 13a is also pressed by the push pin 12a, and the arm member 13a rotates in a direction of an arrow A6 that is a direction away from the side surface 206 around a pivotally supported point thereof. At that time, the biasing member 14a is pulled. Furthermore, when the pressing against the end portion 12a-1 of the push pin 12a is released, the arm member 13a returns to the initial position (a position illustrated in FIG. 7 in which the push pin 12a is not pushed into the casing 200, and the reel R1a and the mediation gear G2a are in contact with each other) by the biasing of the biasing member 14a.

Figure 12:
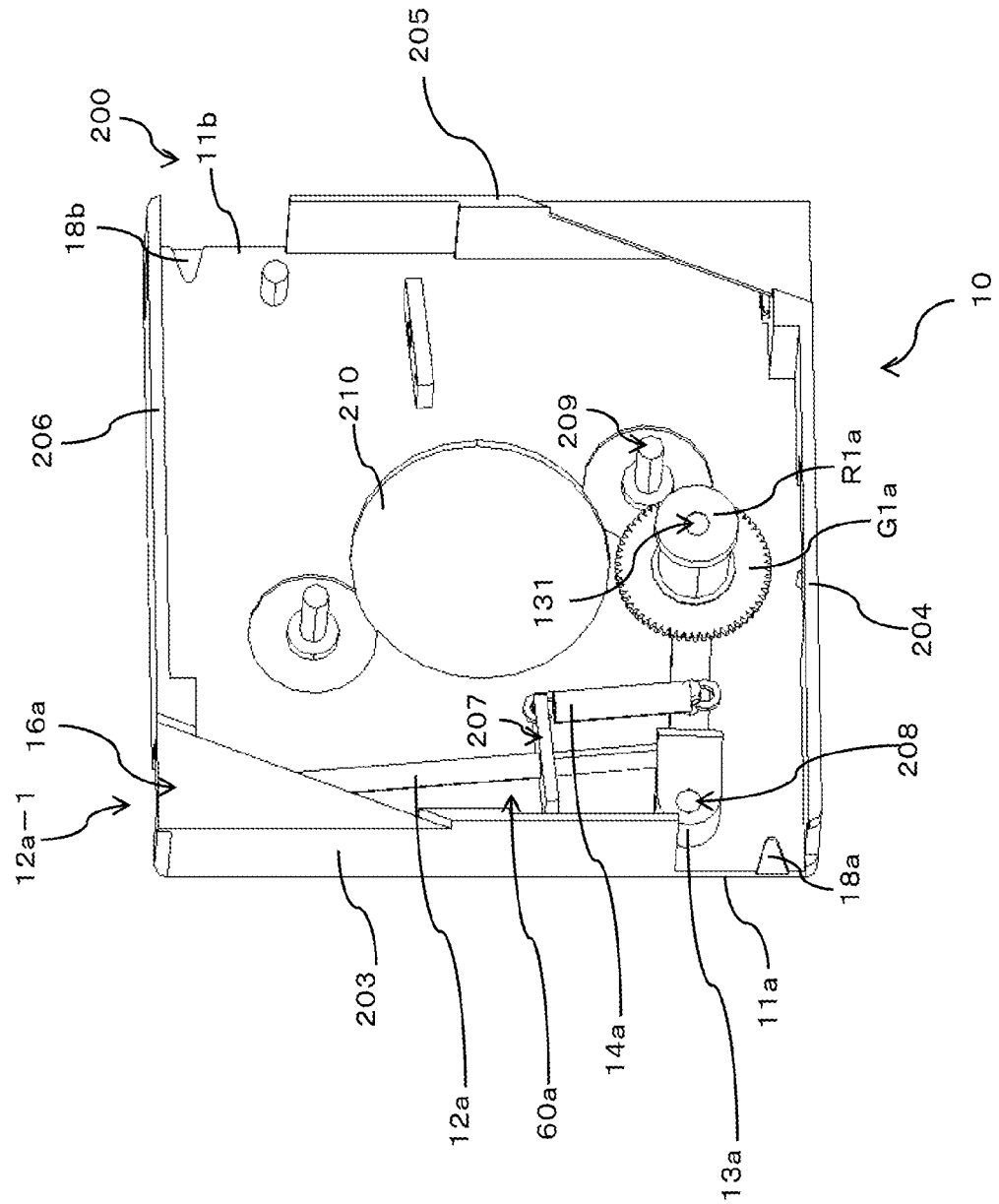
FIG. 12 is a diagram illustrating a functional configuration of the diagnostic LTO medium as an example of the exemplary embodiment.
Figure 13:
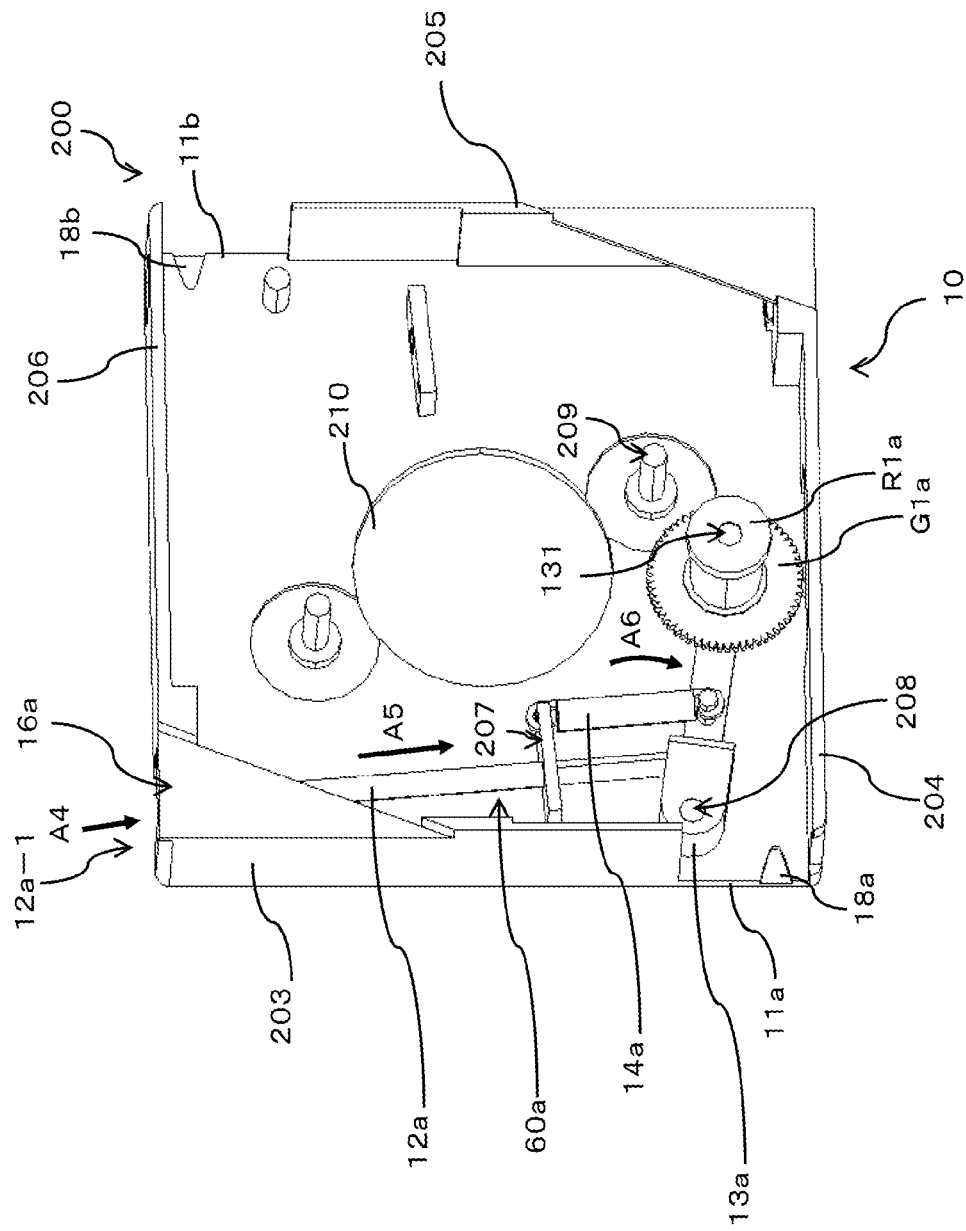
FIG. 13 is a diagram illustrating a functional configuration of the diagnostic LTO medium as an example of the exemplary embodiment.

FIGS. 12 and 13 illustrate a reel R1a in addition to FIGS. 10 and 11 as described above. Specifically, FIG. 12 illustrates a state in which the arm member 13a is located at the initial position, and FIG. 13 illustrates a state in which the arm member 13a is spaced apart from the initial position.

The reel R1a is pivotally attached to the shaft 131 of the arm member 13a. The reel R1a has a winding core for winding the LTO-3 tape 15a. Furthermore, the gear G1a is provided concentrically with the winding core on the bottom surface 202 side. The gear G1a included in the reel R1a is meshed with a mediation gear G2a as described later.

As illustrated in FIG. 13, when the end portion 12a-1 of the push pin 12a is pushed into the casing 200 from the outside, the reel R1a moves in a direction away from the side surface 206 along with the arm member 13a. Meanwhile, when the pressing against the end portion 12a-1 of the push pin 12a is released, the reel R1a returns to the initial position (see FIG. 12) together with the arm member 13a by biasing of the biasing member 14a.

Figure 14:
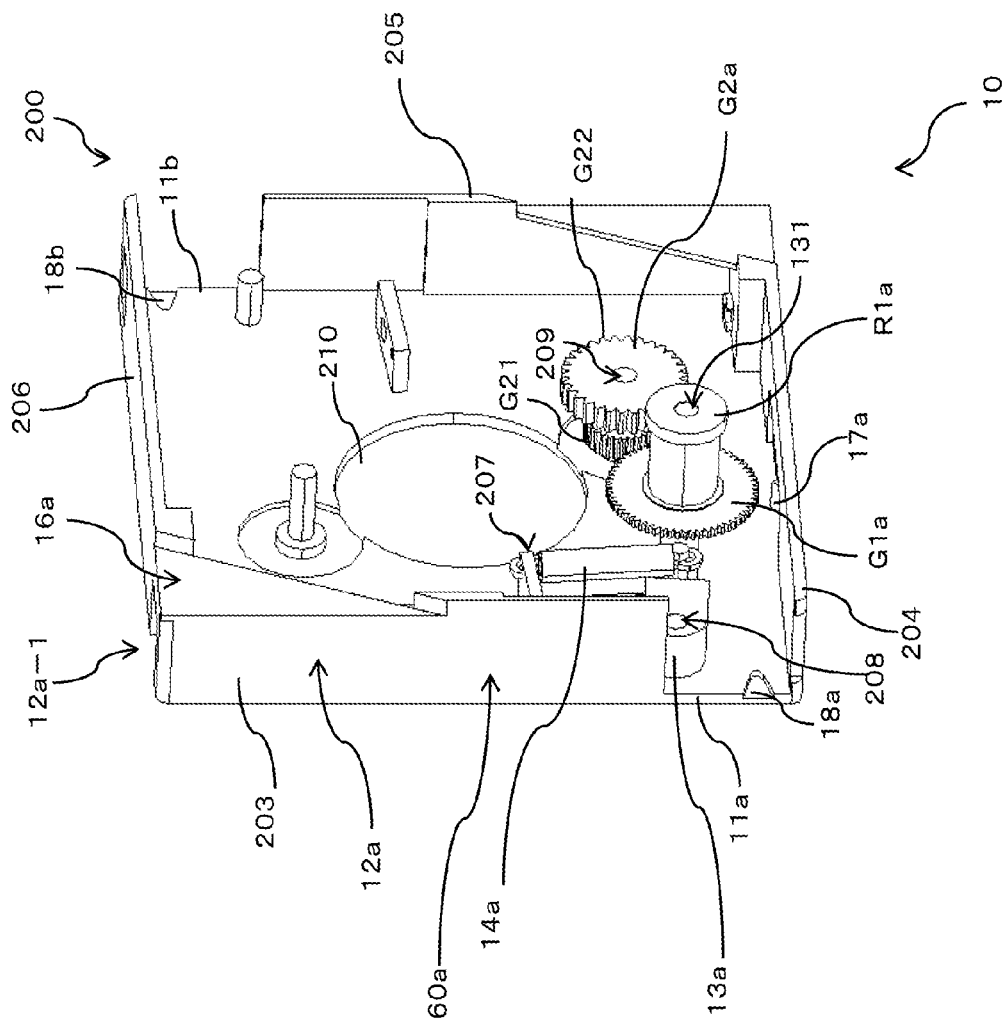
FIG. 14 is a diagram illustrating a functional configuration of the diagnostic LTO medium as an example of the exemplary embodiment.
Figure 15:
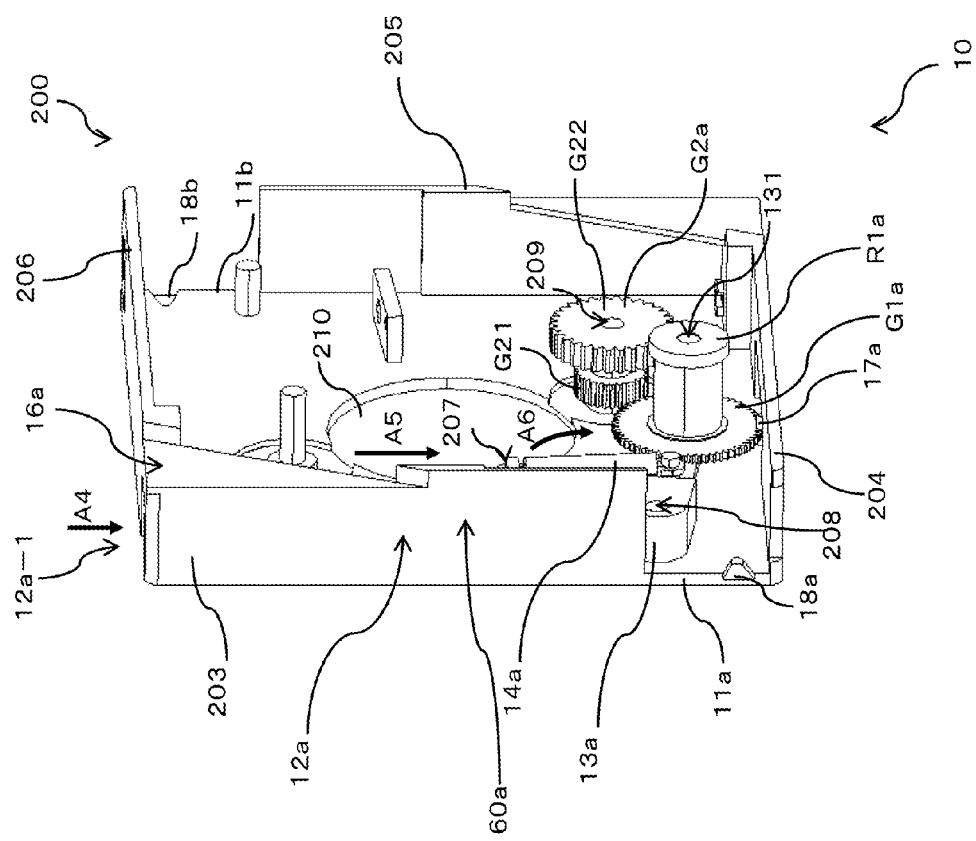
FIG. 15 is a diagram illustrating a functional configuration of the diagnostic LTO medium as an example of the exemplary embodiment.

FIGS. 14 and 15 illustrate a rotation suppressing unit 17a and a mediation gear G2a, in addition to FIGS. 12 and 13 described above. Specifically, FIG. 14 illustrates a state in which the arm member 13a is located at the initial position, and FIG. 15 illustrates a state in which the arm member 13a is spaced apart from the initial position.

For example, as illustrated in FIG. 7, the mediation gear G2a transmits the driving of the drive gear GR to the gear G1a. In addition, the mediation gear G2a is pivotally attached to a shaft 209 which projects to be parallel to the shaft 208 from the bottom surface 202.

The mediation gear G2a is a two-stage gear, a gear (a lower gear) G21 on the bottom surface side 202 of the diagnostic LTO medium 10 is meshed with the gear G1a of the reel R1a, and a gear (an upper gear) G22 coaxial with the lower gear G21 and adjacent to the opposite side to the bottom surface 202 is meshed with the drive gear GR as will be described below.

The rotation suppressing unit 17a is provided on the inner wall surface of the side surface 204, and has a convex shape capable of entering between the teeth of the gear G1a.

As illustrated in FIG. 15, when the end portion 12a-1 of the push pin 12a is pressed, and the arm member 13a rotates from the initial position (see FIG. 14), the gear G1a is separated from the lower gear G21 of the mediation gear G2a, and the engagement between the gear G1a of the reel R1a and the lower gear G21 of the mediation gear G2a is released. At that time, the rotation suppressing unit 17a is engaged with the gear G1a of the reel R1a to suppress the rotation thereof. That is, the gear G1a is engaged with the rotation suppressing unit 17a formed in the casing 200 of the side surface 204 at the farthest position from the mediation gear G2a.

Figure 16:
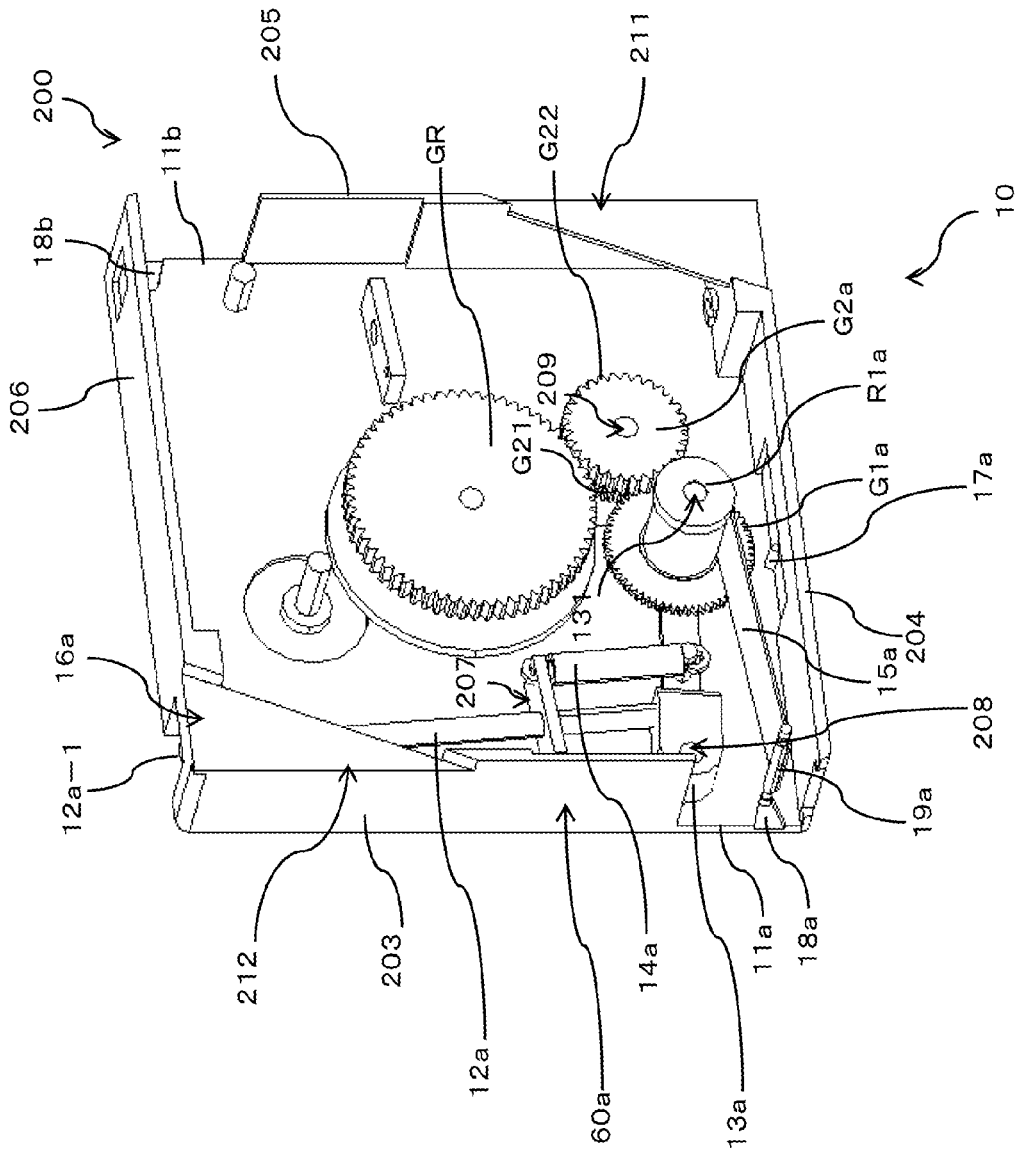
FIG. 16 is a diagram illustrating a functional configuration of the diagnostic LTO medium as an example of the exemplary embodiment.

FIG. 16 illustrates LTO-3 tape 15a, a leader pin 19a, a drive gear GR, and storage units 211 and 212, in addition to FIGS. 14 and 15 described above.

The LTO-3 tape 15a is the same as the tape medium included in the conventional LTO-3 medium, and the details of the manufacturing method and the like will not be described. However, the length of the LTO-3 tape 15a may be a length used for the diagnosis of the drive 50, and, for example, can be set to 50 m. The LTO-3 tape 15a is wound around a winding core of the first reel R1a, and has a leader pin 19a at one end thereof. The leader pin 19a is longer than an interval between the inner surfaces of the top surface 201 and the bottom surface 202, and is shorter than an interval between the outer surfaces of the top surface 201 and the bottom surface 202. The leader pin 19a attached to one end of the LTO-3 tape 15a drawn out of the reel R1a is hooked to triangular recess portions 18a that are formed on the inner surfaces near the opening portion 11a on the top surface 201 and bottom surface 202 so as to face each other, respectively. Thus, the LTO-3 tape 15a is adapted not to be wound by the reel R1a in excess of the state illustrated in FIG. 16.

As described above, when the diagnostic LTO medium 10 is loaded to the drive 50, the drive gear GR is engaged with the motor clutch 52 of the drive 50. Moreover, the drive gear GR transmits the driving force from the motor clutch 52 to the inner casing 200. Furthermore, the drive gear GR is meshed with the upper gear G22 of the mediation gear G2a.

The storage units 211 and 212 can be read and written by the tape device 1, and, for example, is a non-contact type storage device. For example, the storage units 211 and 212 are read and written in a non-contact manner by the drive 50 of the tape device 1, the lower robot hand 21, and the upper robot hand 31, and is configured by an Integrated Circuit (IC) chip. In addition, the storage units 211 and 212 are provided in association with the LTO-3 tape 15a and the LTO-5 tape 15b, respectively. For example, the storage units 211 and 212 store the identification information according to the generation of the tape medium, and the number of times of the tape medium recorded/played back by the drive 50.

Figure 17:
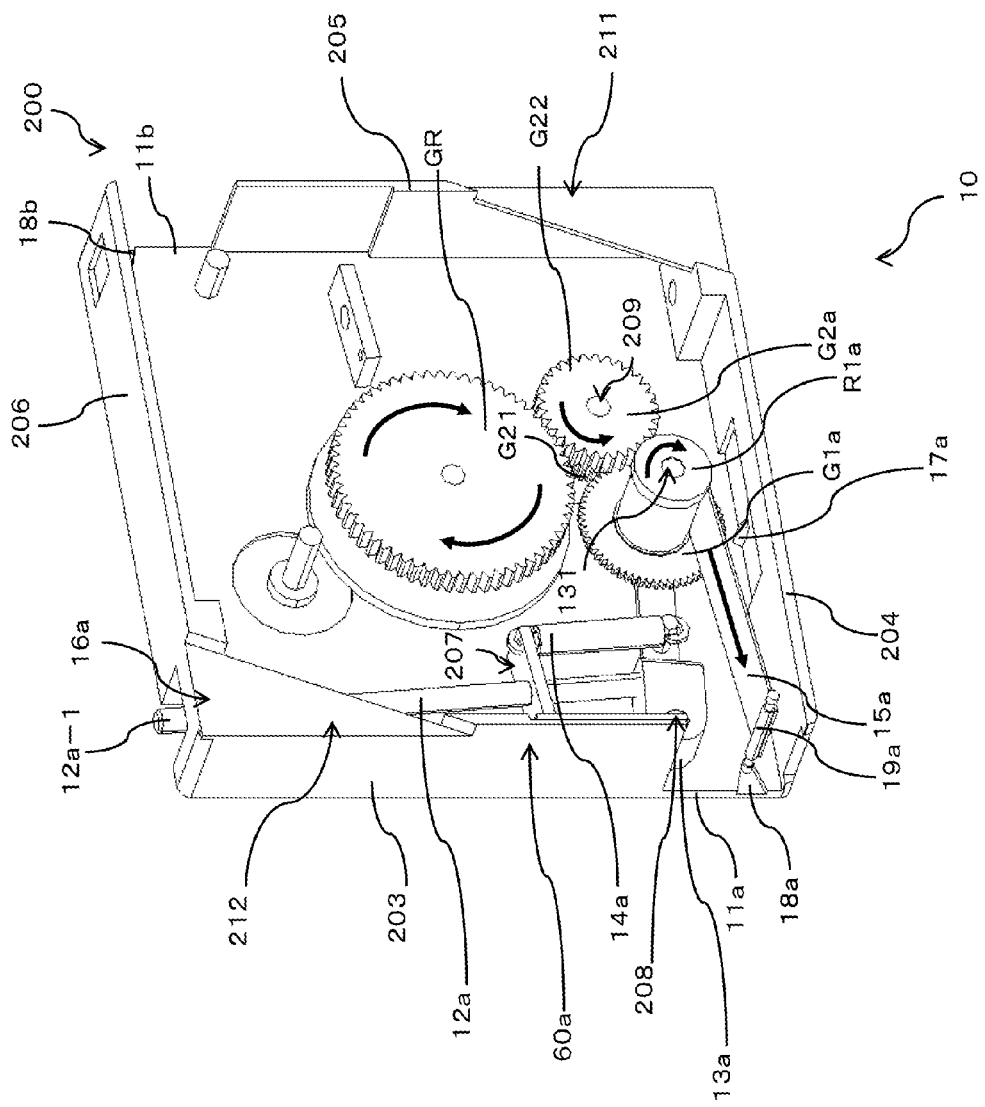
FIG. 17 is a diagram illustrating a functional configuration of the diagnostic LTO medium as an example of the exemplary embodiment.
Figure 18:
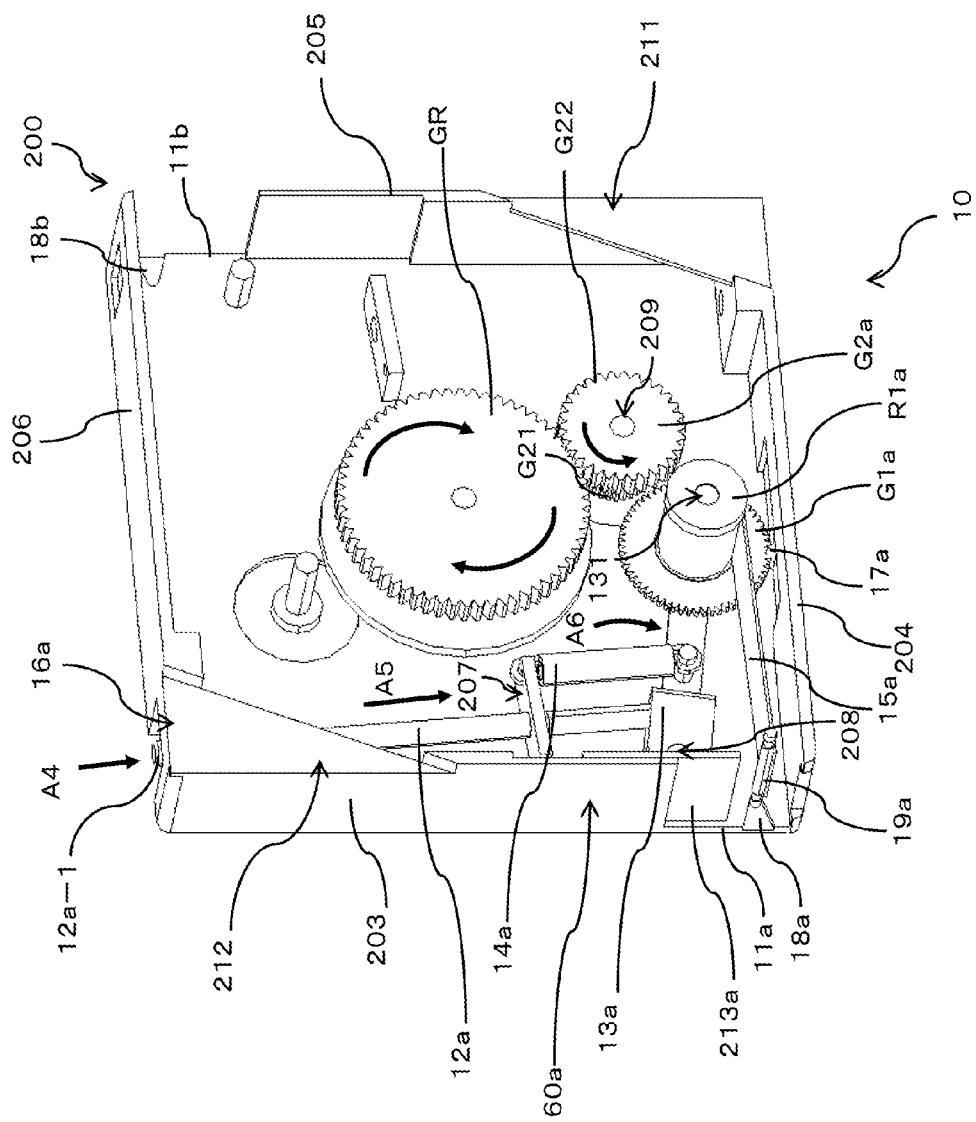
FIG. 18 is a diagram illustrating a functional configuration of the diagnostic LTO medium as an example of the exemplary embodiment.

FIGS. 17 and 18 illustrate a state in which the drive gear GR is rotationally driven.

FIG. 17 illustrates a state in which the end portion 12a-1 of the push pin 12a is not pushed into the casing 200, and FIG. 18 illustrates a state in which the end portion 12a-1 of the push pin 12a is pushed into the casing 200.

As illustrated in FIG. 17, when the end portion 12a-1 of the push pin 12a is not pushed, the gear R1a of the reel G1a is meshed with the lower gear G21 of the mediation gear G2. Furthermore, the upper gear G22 provided coaxially with the lower gear G21 is also meshed with the drive gear GR. That is, the driving force from a motor clutch 52 of the drive 50 to be described later to the drive gear GR is transmitted to the upper gear G22 of the mediation gear G2a. Furthermore, the lower gear G21 provided coaxially with the upper gear G22 transmits the driving force to the gear G1a of the reel R1a. Since the reel R1a to which the driving force is applied in this way rotates, the wound LTO-3 tape 15a is delivered to the outside of the diagnostic LTO medium 10 from the opening portion 11a.

Meanwhile, as illustrated in FIG. 18, in a case in which the end portion 12a-1 of the push pin 12a is pressed from the outside of the diagnostic LTO medium 10, the arm member 13a is also pressed by the push pin 12a, and the arm member 13a rotates around an shaft 208 that is pivotally supported. Along with this, the reel R1a provided at one end of the arm member 13a also moves, and the reel R1a is separated from the initial position (see FIG. 17). In other words, the drive gear GR is meshed with the mediation gear G2a, but the mediation gear G2a is not meshed with the gear G1a of the reel R1a. That is, the driving force from the drive gear GR rotationally driven by the motor clutch 52 of the drive 50 to be described later is prevented from being transmitted to the reel R1a. At that time, the rotation suppressing unit 17a is engaged with the gear of the reel R1a to suppress the rotation thereof, and prevents the LTO-3 tape 15a from being unintentionally drawn or rewound.

In this way, the push pin 12a, the arm member 13a, and the biasing member 14a function as a blocking unit 60a that blocks the transmission of driving force from the drive gear GR to the reel R1a.

In addition, when pushing to the arm member 13a due to the push pin 12a is released, the biasing member 14a pulls the reel R1a back to the initial position (see FIG. 17).

That is, in a case in which there is no pressing to the arm member 13a due to the push pin 12a, the reel R1a is located at a position (a driving force transmitting position) to which the driving force is transmitted as the initial position (see FIG. 17).

In addition, as illustrated in FIG. 18 or the like, the opening portion 11a may be provided with a shutter 213a capable of closing the opening portion 11a. The shutter 213a closes the opening portion 11a, thereby making it possible to prevent the damage to the LTO-3 tape 15a or the like in the casing 200. However, when the diagnostic LTO medium 10 is loaded to the drive 50, and the reel R1a is located at the driving force transmitting position (when the LTO-3 tape 15a is used), the shutter 213a is opened, and thus the LTO-3 tape 15a can be delivered from the opening portion 11a.

Since the opening portion 11b, the push pin 12b, the arm member 13b, the biasing member 14b, the LTO-5 tape 15b, the E ring 16b, the rotation suppressing unit 17b, the recess portion 18b, the leader pin 19b, the shutter 213b, the reel R2a, and the mediation gear G2b have the functional configuration similar to that of the opening portion 11a, the push pin 12a, the arm member 13a, the biasing member 14a, the LTO-3 tape 15a, the E rings 16a, the rotation suppressing unit 17a, the recess portion 18a, the leader pin 19a, the shutter 213b, the reel R1a, and the mediation gear G2a, respectively, the description thereof will not be provided.

[A-3] Operation

Figure 20:
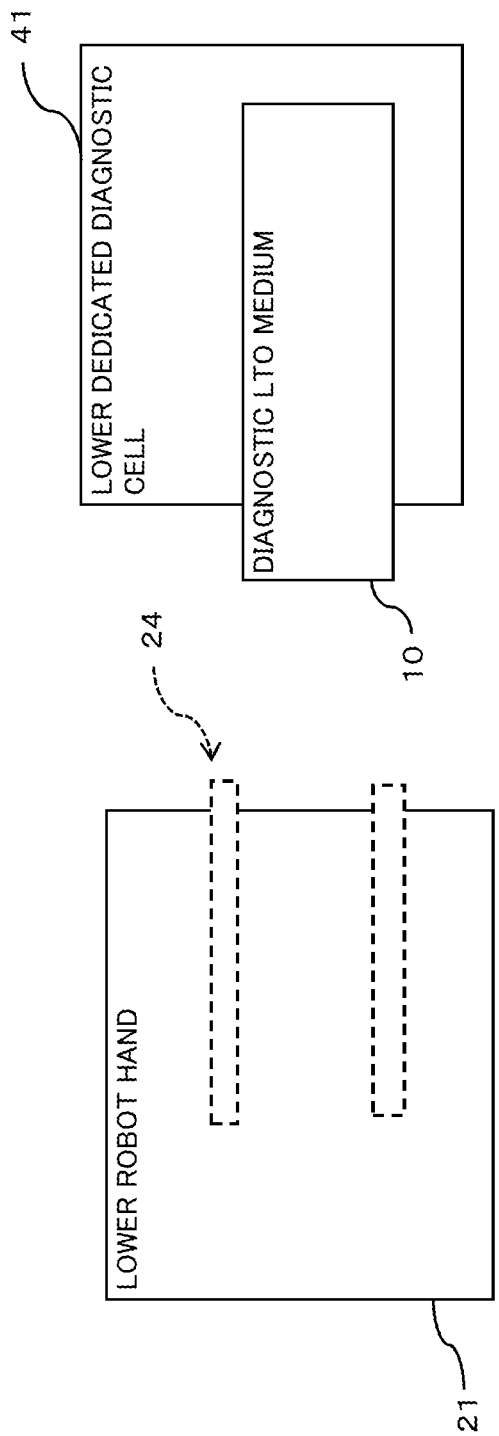
FIG. 20 is a diagram illustrating a diagnostic process in the tape device as an example of the exemplary embodiment.
Figure 21:
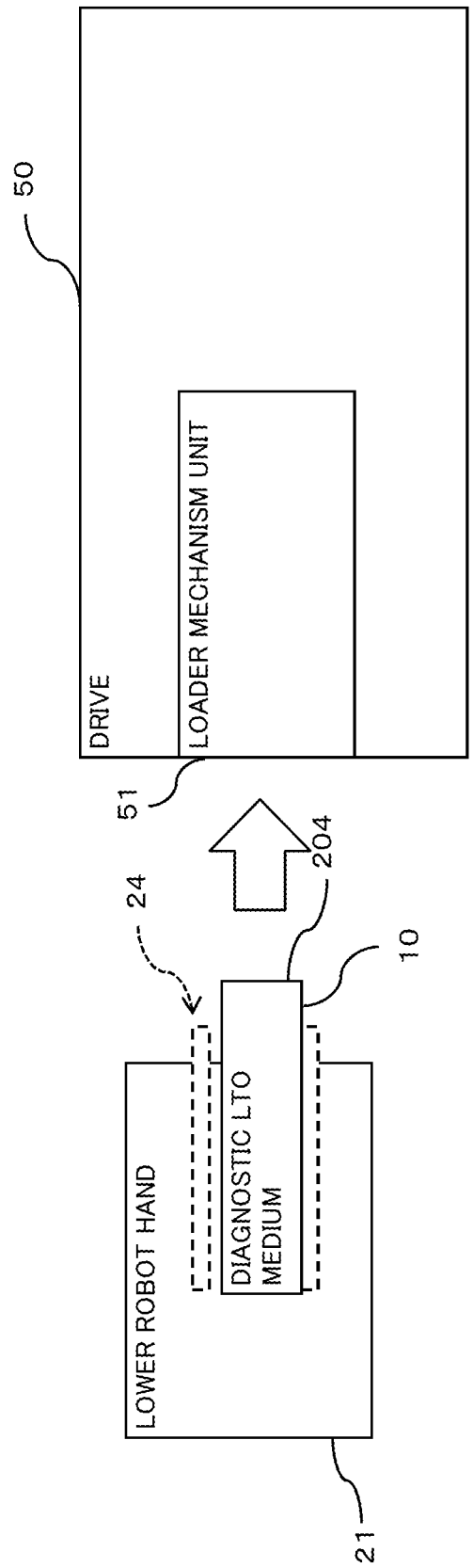
FIG. 21 is a diagram illustrating a diagnostic process in the tape device as an example of the exemplary embodiment.
Figure 23:
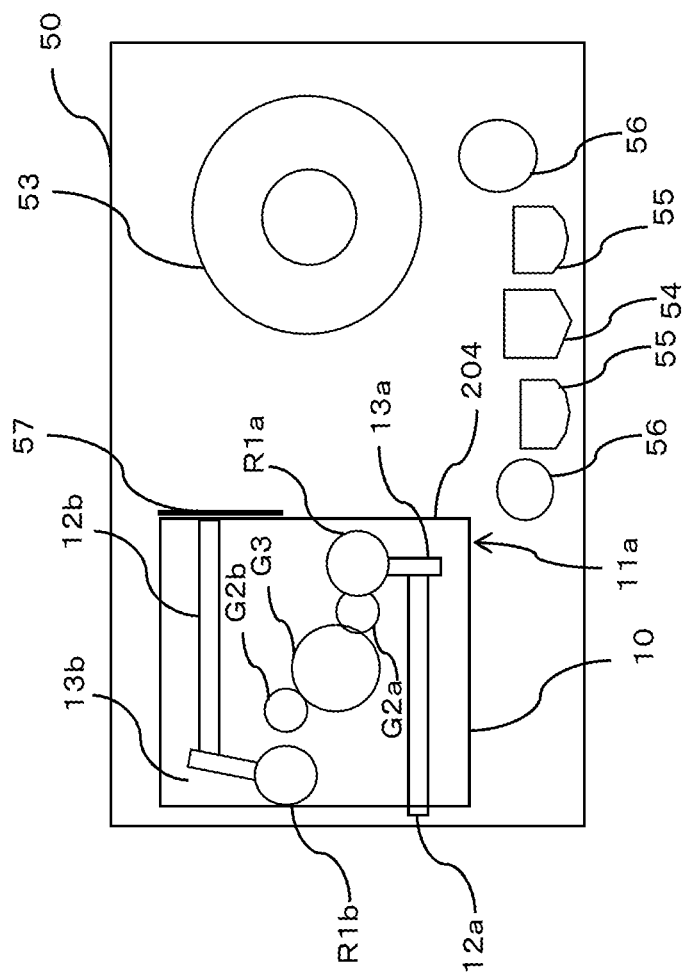
FIG. 23 is a diagram illustrating a diagnostic process in the tape device as an example of the exemplary embodiment.
Figure 24:
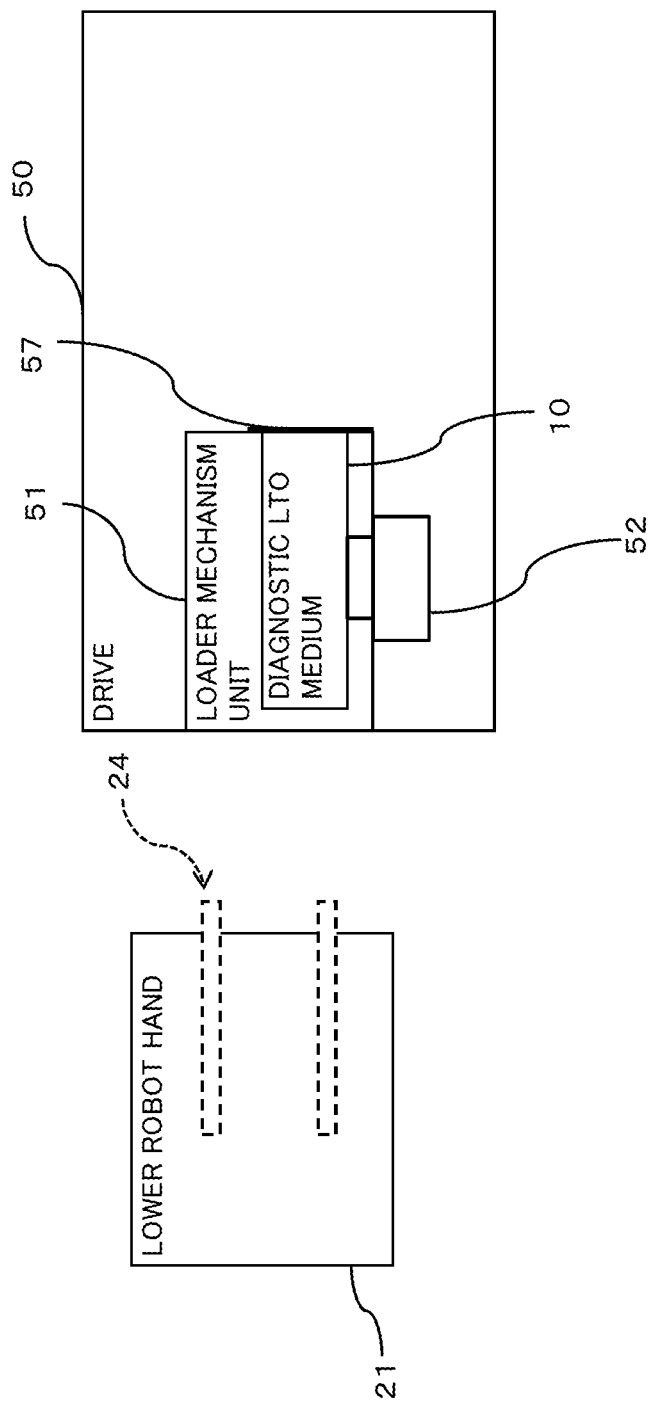
FIG. 24 is a diagram illustrating a diagnostic process in the tape device as an example of the exemplary embodiment.
Figure 25:
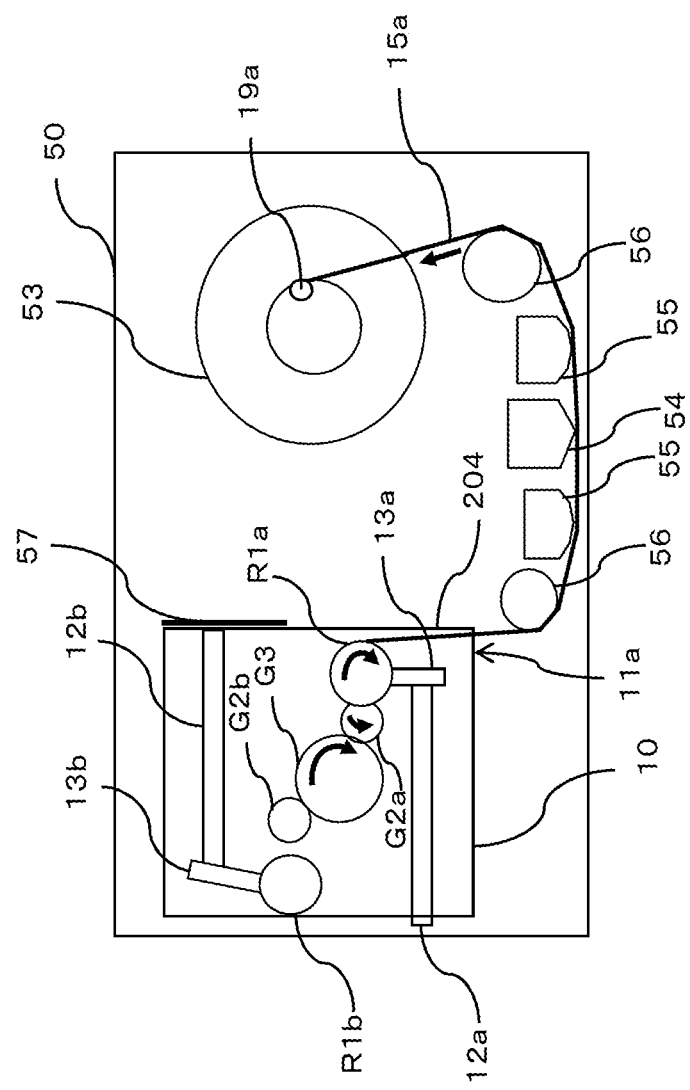
FIG. 25 is a diagram illustrating a diagnostic process in the tape device as an example of the exemplary embodiment.

The diagnostic process in the tape device 1 as an example of the exemplary embodiment configured as described above will be described according to the flowchart (steps A10 to A180) illustrated in FIG. 19 with reference to FIGS. 20 to 25. FIGS. 20, 21, and 24 are side views of a part of the housing 100, and FIGS. 22, 23, 25 are top views of a part of the housing 100.

In addition, in the description of the diagnosis process, an example of the diagnostic process using the LTO-3 tape 15a will be described.

Here, the LTO-3 tape is wound around the reel R1a of the diagnostic LTO medium 10, and the LTO-5 tape is wound around the reel R2a.

Hereinafter, the process (Steps A10 to A40, and A150 to A180) for controlling the lower robot hand 21 is performed under the control of a control device (not illustrated).

As illustrated in FIG. 20, the lower robot hand 21 is moved to the lower dedicated diagnostic cell 41 (Step A10).

The diagnostic LTO medium 10 stored in the lower dedicated diagnostic cell 41 is gripped and pulled out by the gripping unit 24 of the lower robot hand 21 (Step A20).

As illustrated in FIG. 21, the lower robot hand 21 is moved to the specified drive 50 (Step A30).

As illustrated in FIG. 22, the diagnostic LTO media 10 is loaded to the drive (step A40) by the lower robot hand 21 so that the side surface 204 side in which the LTO-3 tape 15a is wound is located at the head.

As illustrated in FIG. 23, the side surface 204 side of the diagnostic LTO medium 10 loaded into the drive 50 abuts against the wall 57 of the loader mechanism unit 51 of the drive 50 (Step A50).

At this time, the second push pin 12b projecting from the side surface 204 is pressed by the wall 57, and is pushed into the casing 200. The arm member 13b rotates around the shaft 208 (Step A60).

The reel R2a is separated from the driving force transmitting position engaged with the mediation gear G2a (Step A70). Thus, the transmission of the driving force to the reel R2a is blocked. Furthermore, in the state spaced from the mediation gear G2a, the rotation suppressing unit 17b formed on the side surface 206 is engaged with the gear G1a of the reel R2a to suppress the rotation thereof.

The LTO-5 tape 15b wound around the reel R2a is not sent out of the opening portion 11b by the above-described process.

As illustrated in FIG. 24, the drive gear GR is meshed with the motor clutch 52 (Step A80).

Thereafter, the drive gear GR rotates, and the leader pin 19a provided at one end of the LTO-3 tape 15a is sent out of the opening portion 11a (Step A90).

As illustrated in FIG. 25, the leader pin 19a passes through the guide 55, the head 54, and the roller guide 56, and is mounted on the machine reel 53 (Step A100).

The LTO-3 tape 15a is wound around the machine reel 53 (Step A110).

Thereafter, the head 54 reads the LTO-3 tape 15a, and thus the diagnosis of the drive 50 is performed (Step A120). In addition, since the diagnostic is performed using the known techniques, the description thereof will not be provided.

After the diagnosis is completed, the drive gear GR rotates to rewind the LTO-3 tape 15a around the reel R1a (Step A130).

The loader mechanism unit 51 ejects the diagnostic LTO media 10 from the drive 50 (Step A140).

The lower robot hand 21 is moved to the drive 50 from which the diagnostic LTO medium 10 is unloaded (Step A150). In addition, in a case in which the lower robot hand 21 loads the diagnostic LTO medium 10 into the drive 50 at Step A40, and then waits in front of the drive 50, this Step A150 can be omitted.

The diagnostic LTO medium 10 ejected from the drive 50 is gripped and pulled out by the gripping unit 24 of the lower robot hand 21 (Step A160).

The lower robot hand 21 is moved to the lower dedicated diagnostic cell 41 to return the diagnostic LTO medium 10 to the lower dedicated diagnostic cell 41 (Step A170).

The lower robot hand 21 waits until the next process (Step A180).

The diagnosis process using the LTO-3 tape 15a is completed in this way.

In addition, the diagnostic process using the LTO-3 tape 15a may be repeated as much as the number of the drive 50 capable of recording or playing back the LTO-3 tape 15a included in the tape device 1 (in an example of the exemplary embodiment, four times of the LTO-G3 drive 50a, the LTO-G4 drive 50b, the LTO-G5 drive 50c, and the LTO-G5 drive 50d).

Figure 26:
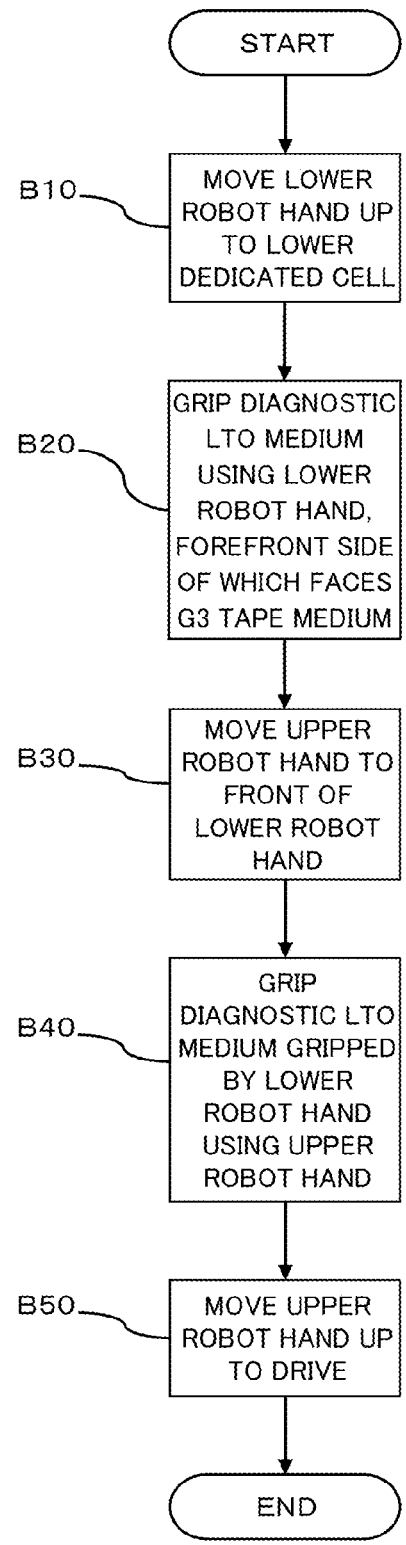
FIG. 26 is a flowchart illustrating a switching process of the type of tape medium used for diagnosis in the tape device as an example of the exemplary embodiment.

Next, the switching process of the type of tape media used for diagnosis in the tape device 1 as an example of the exemplary embodiment configured as described above will be described according to the flowchart (Steps B10 to B50) illustrated in FIG. 26 with reference to FIGS. 27 and 28. FIGS. 27 and 28 are side views of a part of the housing 100.

As described above, in the diagnostic LTO medium 10, the LTO-3 tape 15a is pulled out of the opening portion 11a, and the LTO-5 tape 15b is pulled out of the opening portion 11b located at the point-symmetrical position around the axis of rotation of the drive gear GR. Therefore, by rotating the diagnostic LTO medium 10 around the axis of rotation of the drive gear GR by 180°, it is possible to change the type of tape media.

The following process is performed under the control of the control device (not illustrated).

The lower robot hand 21 is moved to the lower dedicated diagnostic cell 41 (Step B10).

Figure 27:
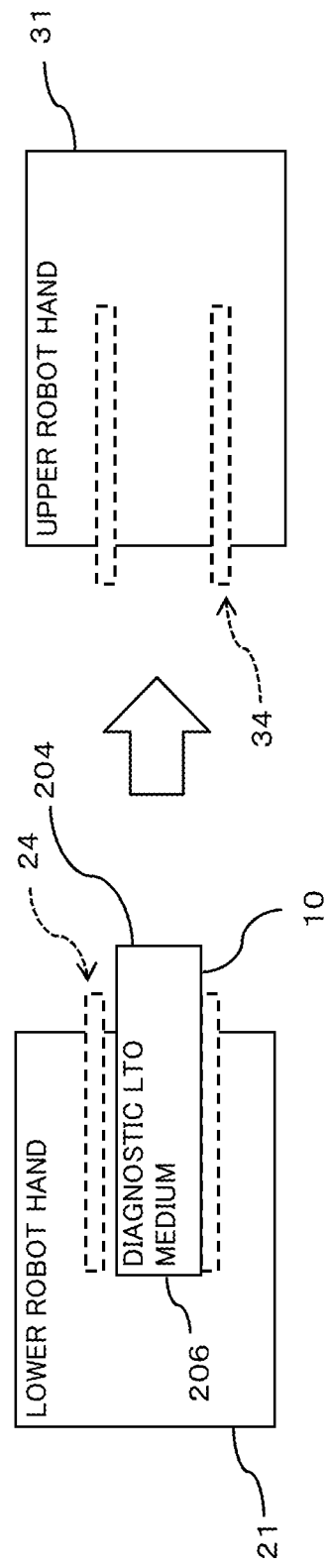
FIG. 27 is a diagram illustrating a switching process of the type of tape medium used for diagnosis in the tape device as an example of the exemplary embodiment.
Figure 28:
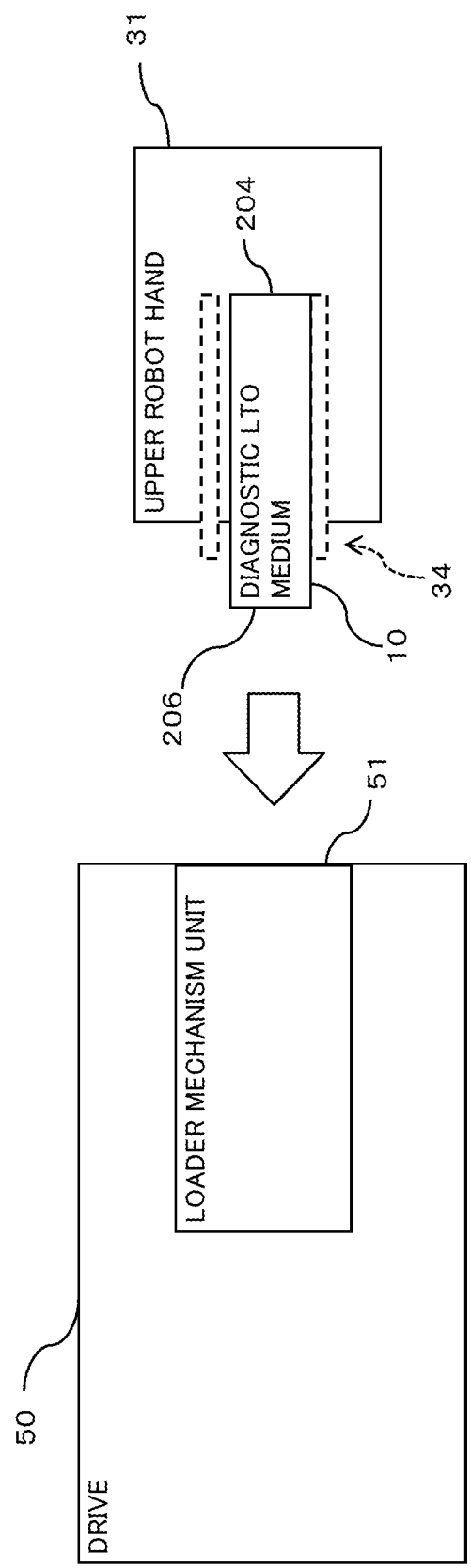
FIG. 28 is a diagram illustrating a switching process of the type of tape medium used for diagnosis in the tape device as an example of the exemplary embodiment.

As illustrated in FIG. 27, the diagnostic LTO media 10 is gripped by the gripping unit 24 of the lower robot hand 21 so that the side surface 204 side thereof is located at the head (Step B20).

The upper robot hand 31 is moved in front of the lower robot hand 21 (Step B30).

The diagnostic LTO medium 10 gripped by the lower robot hand 21 is gripped by the gripping unit 34 of the upper robot hand 31 (Step B40).

Through the above process, as illustrated in FIG. 28, the gripping unit 34 of the upper robot hand 31 grips the diagnostic LTO media 10 so that the side surface 206 side thereof is located at the head.

Moreover, the upper robot hand 31 moves to the specified drive 50 (step B50).

Figure 19:
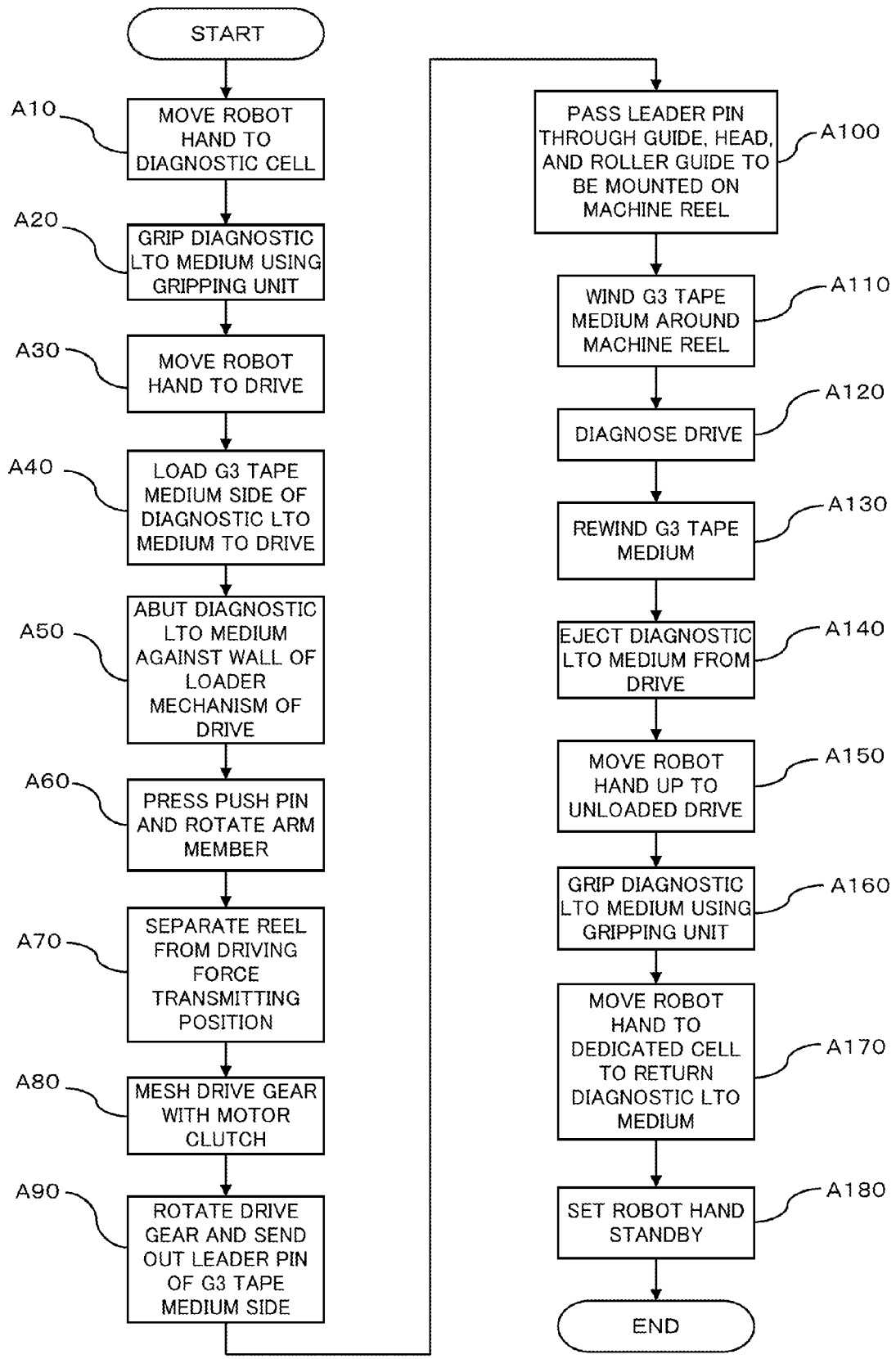
FIG. 19 is a flowchart illustrating a diagnostic process in the tape device as an example of the exemplary embodiment.

In this way, by inserting the diagnostic LTO medium 10 into the drive 50 so that the side surface 206 side is located at the head by the upper robot hand 31 to perform process as illustrated in FIG. 19 after Step A40, it is possible to perform the diagnostic process using the LTO-5 tape 15b.

That is, the lower robot hand 21 changes the direction of inserting the diagnostic LTO medium 10 into the drive 50, by delivering the conveying diagnostic LTO medium 10 to the upper robot hand 31.

In addition, the diagnostic process using the LTO-5 tape 15b may be repeated as much as the number of the drive 50 capable of recording or playing back the LTO-5 tape 15b provided in the tape device 1 (in an example of the exemplary embodiment, twice of the LTO-G5 drive 50c, and the LTO-G5 drive 50d).

[A-4] Effect

In this way, according to the diagnostic LTO medium 10 as an example of the exemplary embodiment, it is possible to mount the two generations of the LTO-3 tape 15a and the LTO-5 tape 15b on one diagnostic LTO medium 10, and the cost can be reduced.

Furthermore, it is possible to reduce the manufacturing cost, by shortening the lengths of the LTO-3 tape 15a and the LTO-5 tape 15b mounted on the diagnostic LTO medium 10 than the conventional LTO medium.

In addition, by mounting the two generations of the LTO-3 tape 15a and the LTO-5 tape 15b on the diagnostic LTO medium 10, it is possible to halve the number of the diagnostic cells 41 and 42 provided in the tape device 1, and it is possible to reduce the manufacturing cost of the tape device 1.

Furthermore, it is possible to separate the non-used reel of the reels R1a and G2a from the driving force transmitting position, by pressing against the arm members 13a and 13b due to the push pins 12a and 12b. By separating the non-used reel from the driving force transmitting position, the non-used tape medium is not sent out of the opening portions 11a and 11b, it is possible to prevent the failure of the diagnostic LTO medium 10 and the drive 50.

Furthermore, by setting the outer dimension of the casing 200 of the diagnostic LTO medium 10 to be the same as the conventional LTO medium, it is possible to implement the existing drive 50 without repair.

In addition, since the rotation suppressing unit 17a suppresses the rotation of the reel of the non-use side in the casing 200, it is possible to prevent the non-used tape medium from being unwound due to vibration, and to prevent the diagnostic LTO medium 10 from breaking down.

Furthermore, the tape device 1 is able to reliably manage the diagnostic LTO media 10, by referring to information kept in the storage units 211 and 212.

Furthermore, according to the tape device 1 as an example of the exemplary embodiment, since the lower robot hand 21 delivers the diagnostic LTO medium 10 to the upper robot hand 31, it is possible to diagnose the three generations of the drives by one diagnostic LTO medium 10.

[B] MODIFIED EXAMPLE

[B-1] First Modified Example

In an example of the exemplary embodiment described above, switching of types of the tape media used by the drive 50 is performed using the lower robot hand 21 and the upper robot hand 31, but not limited thereto. For example, an operator may manually perform switching of the type of tape media used by the drive 50.

Figure 29:
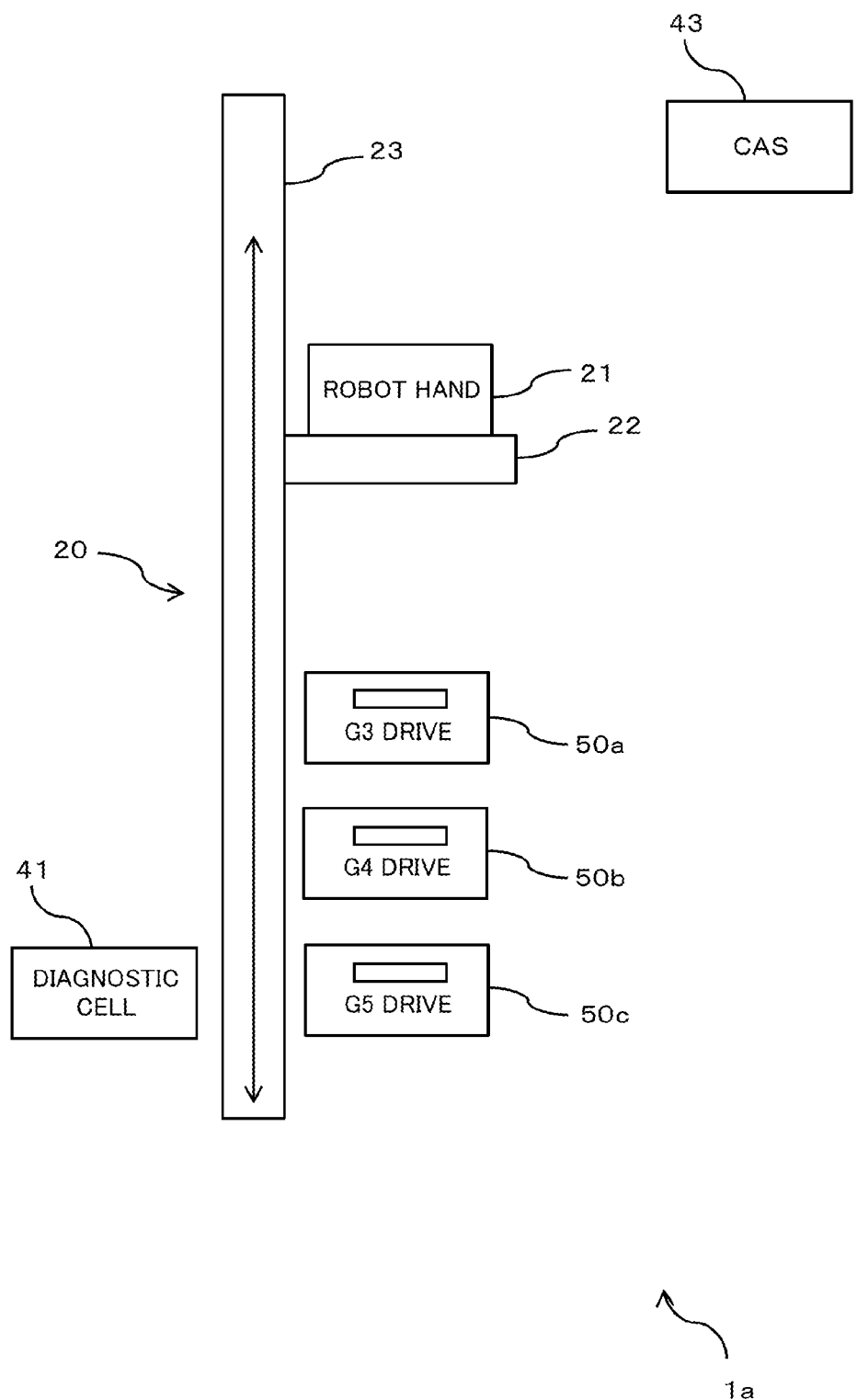
FIG. 29 is a diagram schematically illustrating a hardware configuration of a tape device as a first modified example of the exemplary embodiment.
Figure 30:
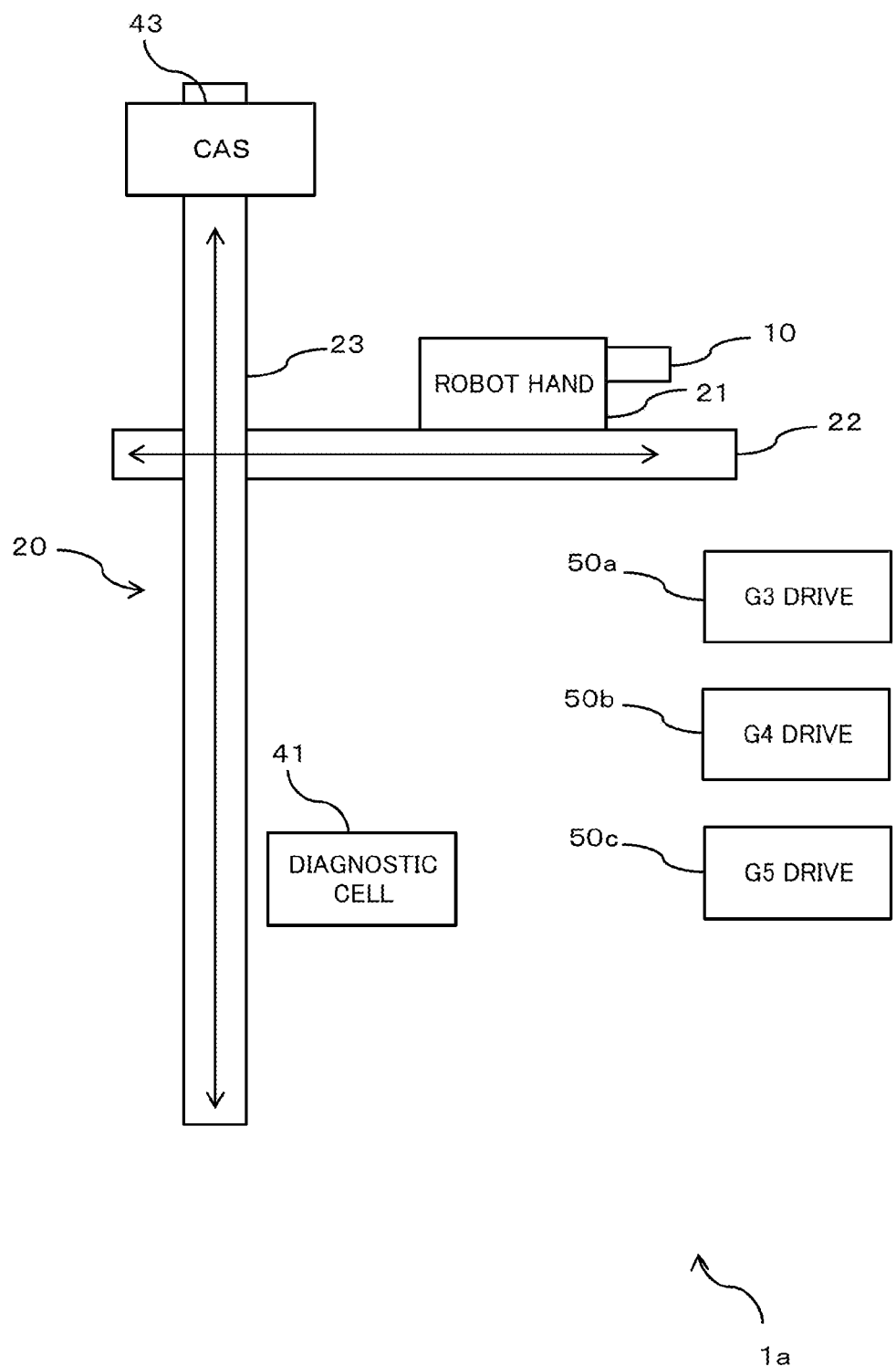
FIG. 30 is a side view of FIG. 29.
Figure 31:
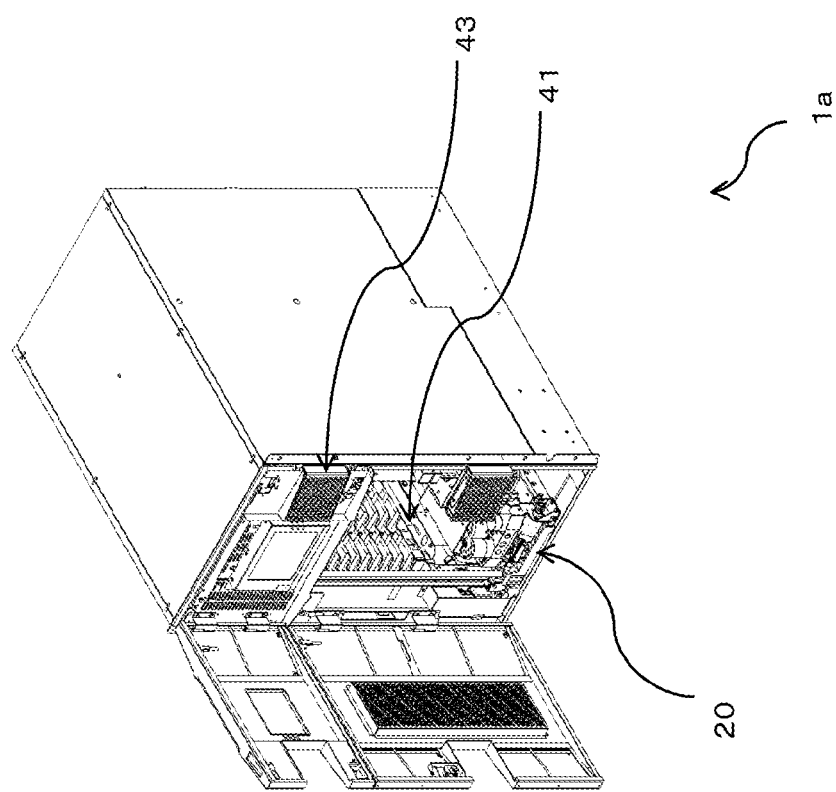
FIG. 31 is a perspective view illustrating an exterior of the tape device as the first modified example of the exemplary embodiment.

FIG. 29 is a diagram schematically illustrating a hardware configuration of the tape device as a first modified example of the exemplary embodiment, FIG. 30 is a side view of FIG. 29, and FIG. 31 is a perspective view illustrating an exterior of the tape device as the first modified example of the exemplary embodiment.

Hereinafter, in the drawings, since each of the same reference numerals as reference numerals described above indicates parts similar to each of the reference numerals described above, in some cases, the description thereof will not be provided.

As illustrated in FIG. 29 and FIG. 30, a tape device 1a as the first modified example of the exemplary embodiment includes a robot mechanism 20, a diagnostic cell 41, a Cartridge Access Station (CAS) 43, an LTO-G3 drive 50a, an LTO-G4 drive 50b, and an LTO-G5 drive 50c.

That is, unlike the tape device 1 as an example of the exemplary embodiment, the tape device 1a as the first modified example of the exemplary embodiment includes the robot mechanism 20 and the diagnostic cell 41 one by one.

Similarly to the lower robot mechanism 20 as an example of the exemplary embodiment, the robot mechanism 20 includes a robot hand 21, a horizontal rail 22, and a vertical rail 23.

A CAS 43 is removable from the tape device 1a, and includes a function for allowing an operator to replace the LTO medium stored in each cell in the tape device 1a. In the modified example of the exemplary embodiment, the operator rotates the insertion direction of the diagnostic LTO medium 10 to the CAS 43 by 180°, thereby performing the diagnosis using the LTO-3 tape 15a and the LTO-5 tape 15b.

For example, the robot mechanism 20, the diagnostic cell 41, and the CAS 43 may be implemented as illustrated in FIG. 31.

Figure 32:
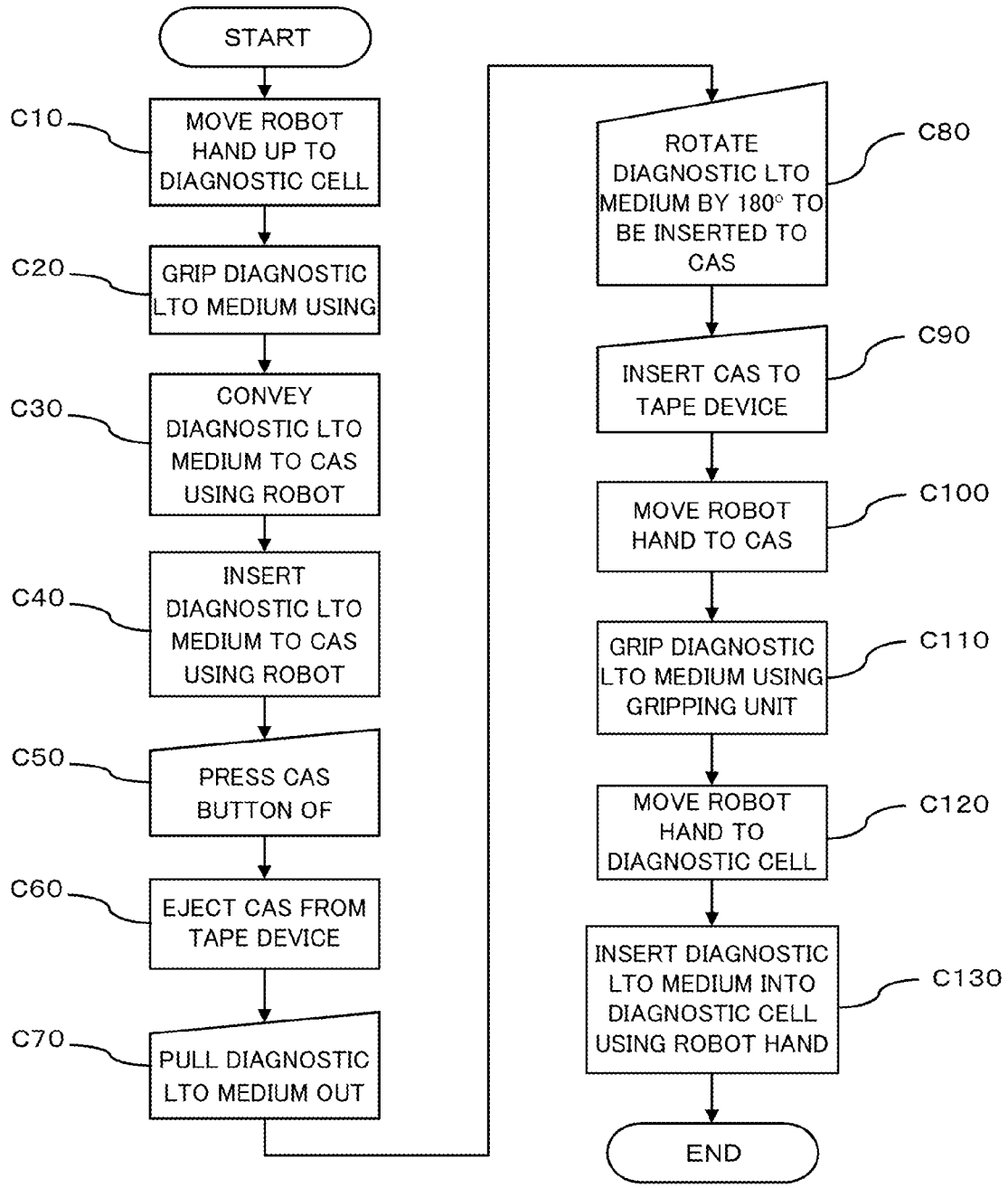
FIG. 32 is a flowchart illustrating a switching process of the type of tape medium used for diagnosis in the tape device as the first modified example of the exemplary embodiment.

The switching process of the type of tape media used for diagnosis in the tape device 1a as the first modified example of the exemplary embodiment configured as described above will be described according to the flowchart (Steps C10 to C130) illustrated in FIG. 32.

Processes other than the following processes performed by the operator (Steps C10 to A40, C60, and C100 to A130) are performed under the control of a control device (not illustrated).

The robot hand 21 is moved to the diagnostic cell 41 (Step C10).

The diagnostic LTO medium 10 is gripped by the gripping unit 24 of the robot hand 21 (Step C20).

The diagnostic LTO medium 10 is conveyed to the CAS 43 by the robot hand 21 (Step C30).

The diagnostic LTO media 10 is inserted to the CAS 43 by the robot hand 21 (Step C40).

The operator presses a CAS button of an operator panel (not illustrated) (Step C50).

The CAS43 is ejected from the tape device 1a (Step C60).

The operator pulls the diagnostic LTO medium 10 out of the CAS 43 (Step C70).

The operator inserts the diagnostic LTO medium 10 into the CAS 43 by rotating the diagnostic LTO medium 10 by 180° (Step C80).

The operator inserts the CAS 43 into the tape device 1a (Step C90).

The robot hand 21 is moved to the CAS 43 (Step C100). In addition, in a case in which the robot hand 21 inserts the diagnostic LTO medium 10 to the CAS 43 at Step A40, and then waits in front of the CAS 43, it is possible to omit this Step C100.

The diagnostic LTO medium 10 is gripped by the gripping unit 24 of the robot hand 21 (Step C110).

The robot hand 21 is moved to the diagnostic cell 41 (Step C120).

The diagnostic LTO media 10 is inserted to the diagnostic cell 41 by the robot hand 21 (Step C130).

By performing the processes illustrated in Steps A10 to A180 of FIG. 19, it is possible to perform the diagnostic process.

In this way, according to the tape device 1a as the first modified example of the exemplary embodiment, it is possible to obtain the same advantageous effects as an example of the exemplary embodiment described above. In addition, it is possible to achieve the following effects.

By using the CAS 43, it is possible to diagnose the drive of third-generation by one diagnostic LTO medium 10.

[B-2] Second Modified Example

In one example of the embodiment described above, the LTO-3 tape 15a and the LTO-5 tape 15b of two types of generation have been included in the diagnostic LTO medium 10, but not limited thereto. For example, other tape media may be included.

For example, in the diagnostic LTO medium 10 in the second modified example of the exemplary embodiment, one of the LTO-3 tape 15a and the LTO-5 tape 15b is a cleaning tape.

Thus, according to the diagnostic LTO medium 10 as the second modified example of the exemplary embodiment, it is possible to obtain the same advantageous effects as an example of the exemplary embodiment described above. In addition, it is possible to achieve the following effects.

It is possible to perform the diagnosis and cleaning by one diagnostic LTO medium 10.

[C] OTHER

The disclosed technique is not intended to be limited to the exemplary embodiments described above, but can be implemented by being variously modified without departing from the scope of the exemplary embodiment. Each configuration and each process of the exemplary embodiment may be selected as needed or appropriately combined.

In an example of the exemplary embodiment described above, the arm members 13a and 13b rotate around the shaft 208, thereby separating the reels R1a and R1b from the driving force transmitting position, but not limited thereto. For example, the reels R1a and R1b may be separated from the driving force transmitting position, by moving the arm members 13a and 13b and the like.

According to the tape cartridge of this disclosure, it is possible to reduce the operating costs of the tape device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A tape cartridge comprising:
   a drive gear that is rotatably driven by a driving device;
   a first reel that winds a first tape-like storage medium therearound and is rotatable by a driving force transmitted from the drive gear;
   a second reel that winds a second tape-like storage medium therearound and is rotatable by a driving force transmitted from the drive gear; and
   a blocking unit that blocks transmission of the driving force from the drive gear to the first or second reel.

2. The tape cartridge according to claim 1,
   wherein the blocking unit blocks the transmission of the driving force to the non-used reel of the first or second reel.

3. The tape cartridge according to claim 1,
   wherein the blocking unit includes
   an arm member pivotally supported at one end thereof and provided in the first or second reel, and
   a pressing unit that presses the arm member to separate the first or second reel from a driving force transmitting position.

4. The tape cartridge according to claim 3, further comprising:
   a biasing member that biases the first or second reel toward the drive force transmitting position when the pressure against the arm member due to the pressing unit is released.

5. The tape cartridge according to claim 1, further comprising:
   a rotation suppressing unit that suppresses the rotation of the first or second reel in a state in which the first or second reel is separated from the driving force transmitting position.

6. The tape cartridge according to claim 1, further comprising:
   a first opening portion that sends the first tape-like storage medium, and
   a second opening portion that sends the second tape-like storage medium.

7. The tape cartridge according to claim 1,
   wherein the first tape-like storage medium and the second tape-like storage medium are tape-like storage media of different types.

8. The tape cartridge according to claim 1,
   wherein any one of the first tape-like storage medium and the second tape-like storage medium is a cleaning tape.

9. The tape cartridge according to claim 1, further comprising:
   a first storage unit that stores information about the first tape-like storage medium, and
   a second storage unit that stores information about the second tape-like storage medium.

10. A tape device comprising:
    a medium storing unit capable of storing a tape cartridge; and
    a medium reading and writing device that reads and writes the tape cartridge,
    wherein the tape cartridge includes
    a drive gear that is rotatably driven by a driving device,
    a first reel that winds a first tape-like storage medium therearound and is rotatable by a driving force transmitted from the drive gear,
    a second reel that winds a second tape-like storage medium therearound and is rotatable by a driving force transmitted from the drive gear, and
    a blocking unit that blocks transmission of the driving force from the drive gear to the first or second reel.

11. The tape device according to claim 10, further comprising:
    a first conveying unit and a second conveying unit that carry the tape cartridge,
    wherein the first conveying unit changes a direction to be inserted into the medium reading and writing device of the tape cartridge, by delivering the tape cartridge to be conveyed to the second conveying unit.

* * * * *